(12) United States Patent
He et al.

(10) Patent No.: US 9,220,076 B2
(45) Date of Patent: Dec. 22, 2015

(54) BASE STATION AND METHOD FOR CLOCK SYNCHRONIZATION OF BASE STATION

(71) Applicant: Huawei Technologies Co., Ltd., Shenzhen (CN)

(72) Inventors: Yong He, Shanghai (CN); Zhunjiang Shi, Shenzhen (CN); Yi Yuan, Shanghai (CN); Ganghua Yang, Shangahi (CN); Maosheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 269 days.

(21) Appl. No.: 13/691,426

(22) Filed: Nov. 30, 2012

(65) Prior Publication Data

US 2013/0107808 A1    May 2, 2013

Related U.S. Application Data

(63) Continuation of application No. PCT/CN2011/074856, filed on May 30, 2011.

(30) Foreign Application Priority Data

May 31, 2010 (CN) .......................... 2010 1 0188622
Mar. 31, 2011 (CN) .......................... 2011 1 0080928

(51) Int. Cl.
*H04W 4/00* (2009.01)
*H04W 56/00* (2009.01)
(Continued)

(52) U.S. Cl.
CPC ............ *H04W 56/00* (2013.01); *H04J 3/0644* (2013.01); *H04W 56/001* (2013.01); *H04W 56/0015* (2013.01); *H04W 88/085* (2013.01)

(58) Field of Classification Search
None
See application file for complete search history.

(56) References Cited

U.S. PATENT DOCUMENTS 8,050,296 B2 * 11/2011 Osterling ...................... 370/503
2006/0160507 A1 * 7/2006 Forrester ...................... 455/147
2009/0121957 A1   5/2009 Kaneko et al.
(Continued)

FOREIGN PATENT DOCUMENTS

CN        1516375 A        7/2004
CN        1540884 A        10/2004
(Continued)

OTHER PUBLICATIONS

Extended European Search Report received in Application No. 11789168.9-1860, Applicant: Huawei Technologies Co., Ltd., mailed Jul. 11, 2013, 10 pages.
(Continued)

*Primary Examiner* — Willie J Daniel, Jr.
(74) *Attorney, Agent, or Firm* — Slater & Matsil, L.L.P.

(57) ABSTRACT

The present invention discloses a radio base station and a method for clock synchronization of the radio base station. The radio base station may include a base station outdoor apparatus including an adapter, a ground service antenna, and a satellite antenna. A base station indoor apparatus includes a satellite signal processing module configured to perform decoding processing on a satellite radio frequency signal received by the satellite antenna to obtain a satellite service signal. The satellite antenna and the ground service antenna are connected to the adapter. The adapter is configured to couple the signals received by the satellite antenna and ground service antenna, and transmit a coupled signal to the base station indoor apparatus through a first data cable.

16 Claims, 21 Drawing Sheets

(51) Int. Cl.
*H04J 3/06* (2006.01)
*H04W 88/08* (2009.01)

(56) References Cited

U.S. PATENT DOCUMENTS

| 2009/0238154 | A1 | 9/2009 | Bommas et al. | |
|---|---|---|---|---|
| 2009/0245228 | A1 | 10/2009 | Osterling | |
| 2010/0226354 | A1* | 9/2010 | Duzdar et al. | 370/339 |
| 2011/0225006 | A1 | 9/2011 | Manning et al. | |
| 2012/0100801 | A1* | 4/2012 | Yuan et al. | 455/14 |

FOREIGN PATENT DOCUMENTS

| CN | 1547399 | A | 11/2004 |
|---|---|---|---|
| CN | 1937447 | A | 3/2007 |
| CN | 101243666 | A | 8/2008 |
| CN | 101485126 | A | 7/2009 |
| CN | 101868055 | A | 10/2010 |
| CN | 101888695 | A | 11/2010 |
| JP | 2000115994 | A | 4/2000 |
| JP | 2004312646 | A | 11/2004 |
| JP | 2011521503 | A | 7/2011 |
| KR | 2002-0041555 | A | 6/2002 |
| KR | 10-2004-0038257 | A | 5/2004 |
| KR | 10-0700459 | B1 | 3/2007 |
| WO | 2009123523 | A | 10/2009 |
| WO | WO 2011/150736 | A1 | 12/2011 |
| WO | WO 2011/150789 | A1 | 12/2011 |

OTHER PUBLICATIONS

International Search Report received in International Application No. PCT/CN2011/073866, Applicant Huawei Technologies Co., Ltd. et al., mailed Aug. 18, 2011, 3 pages.

International Search Report received in International Application No. PCT/CN2011/074856, Applicant Huawei Technologies Co., Ltd. et al., mailed Aug. 25, 2011, 19 pages.

Japanese Notice of Reasons for Rejection received in Application No. 2013-512742, mailed Feb. 4, 2014, 3 pages.

* cited by examiner

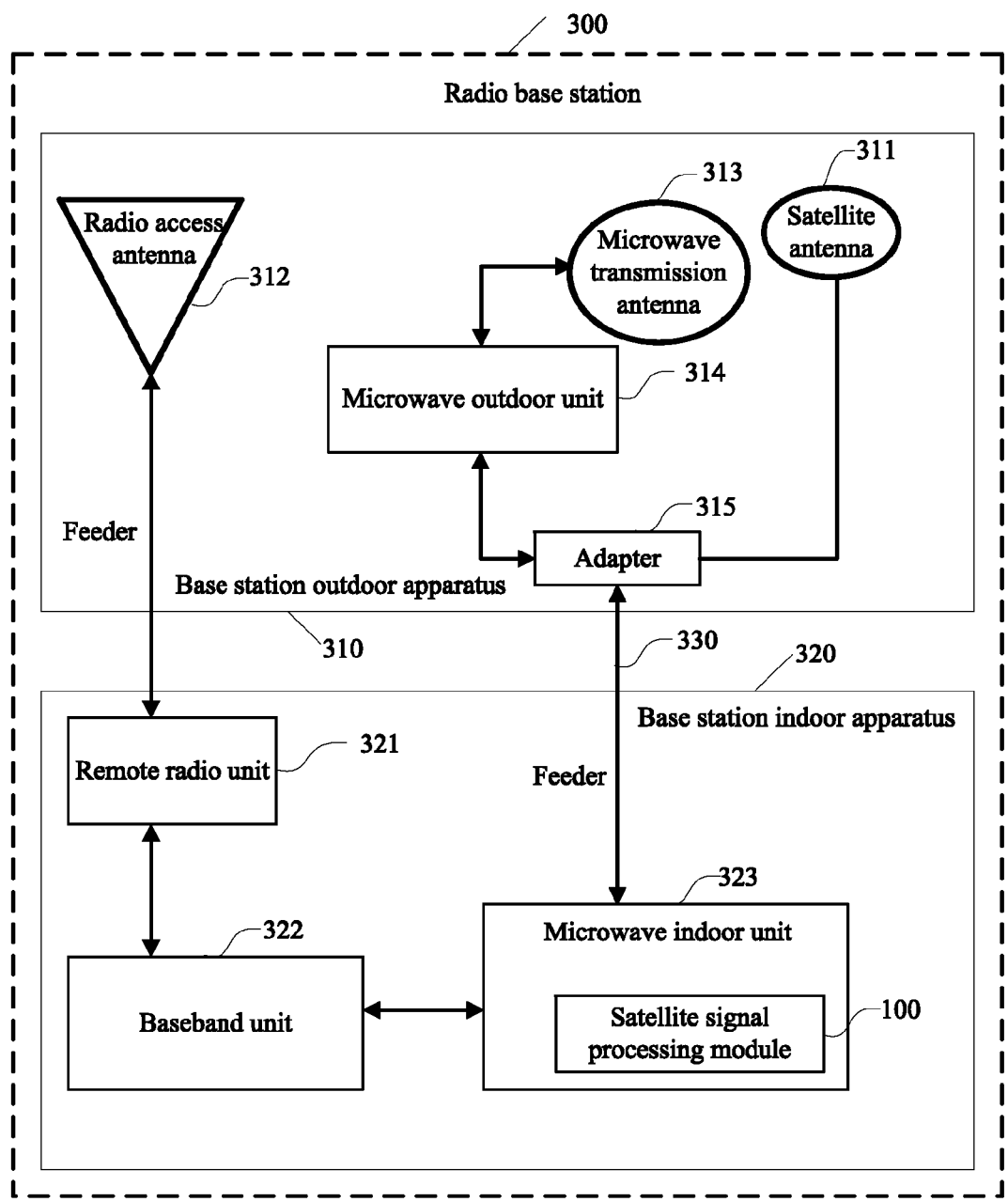
FIG. 3-a

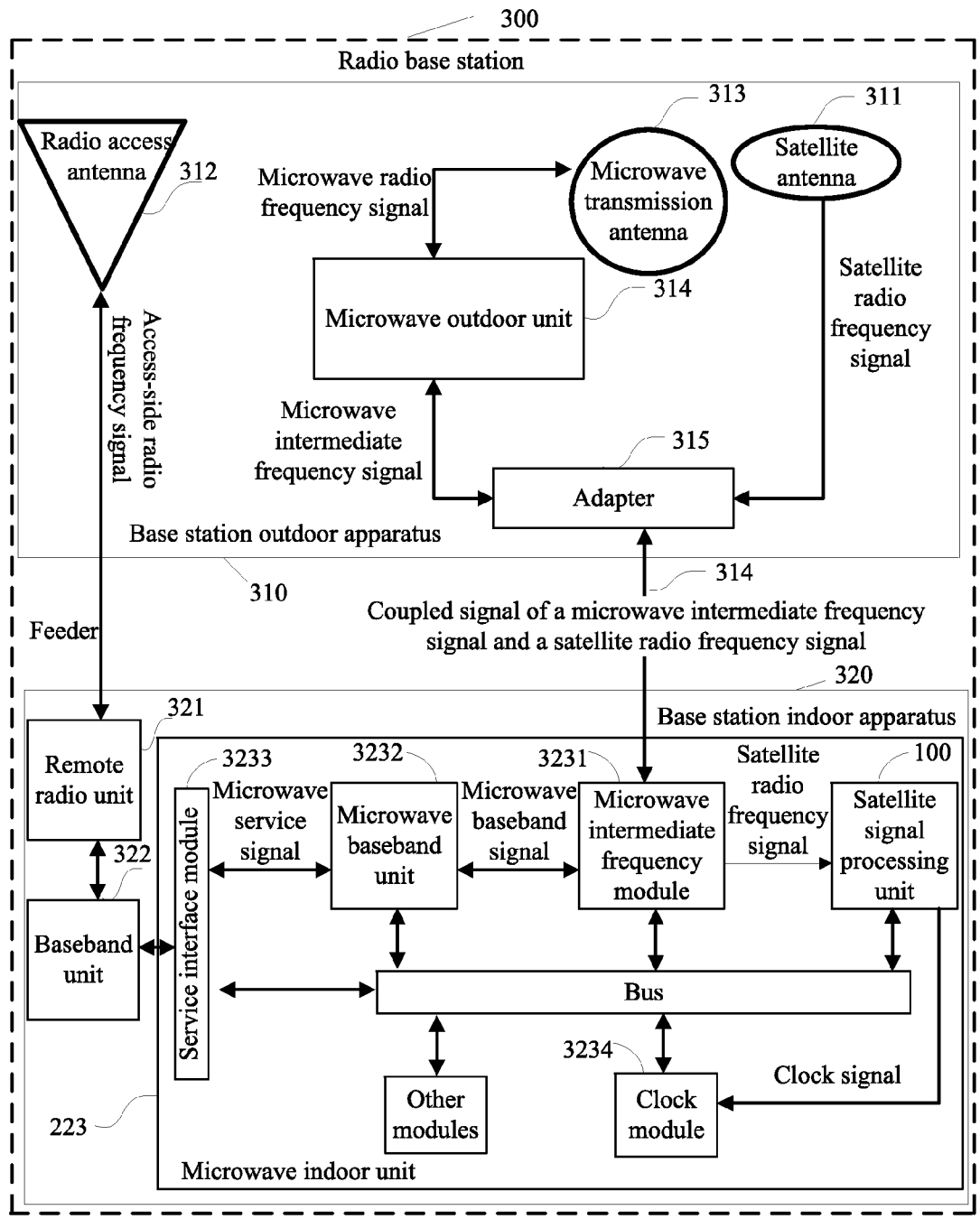
FIG. 3-b

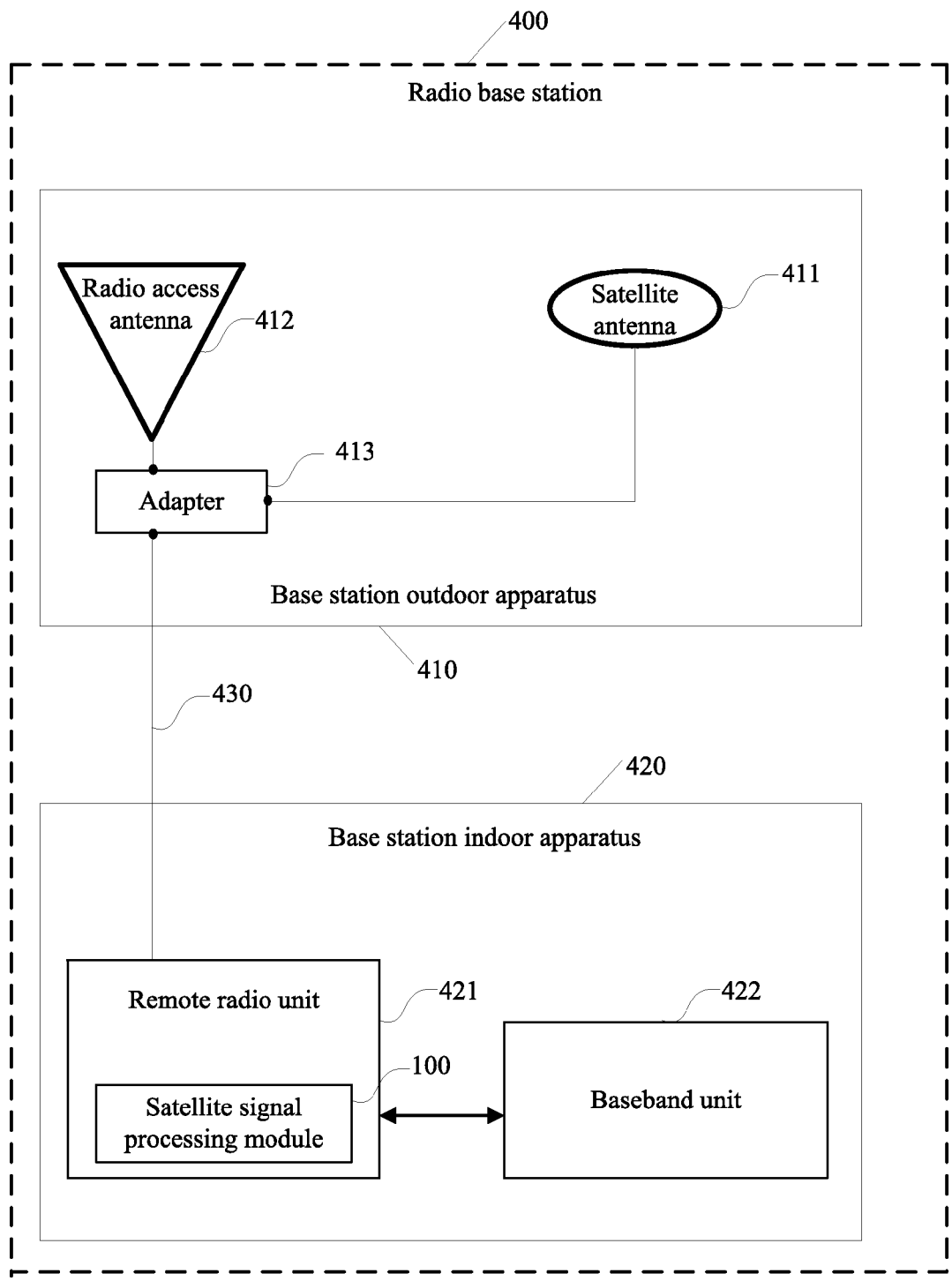
FIG. 4-a

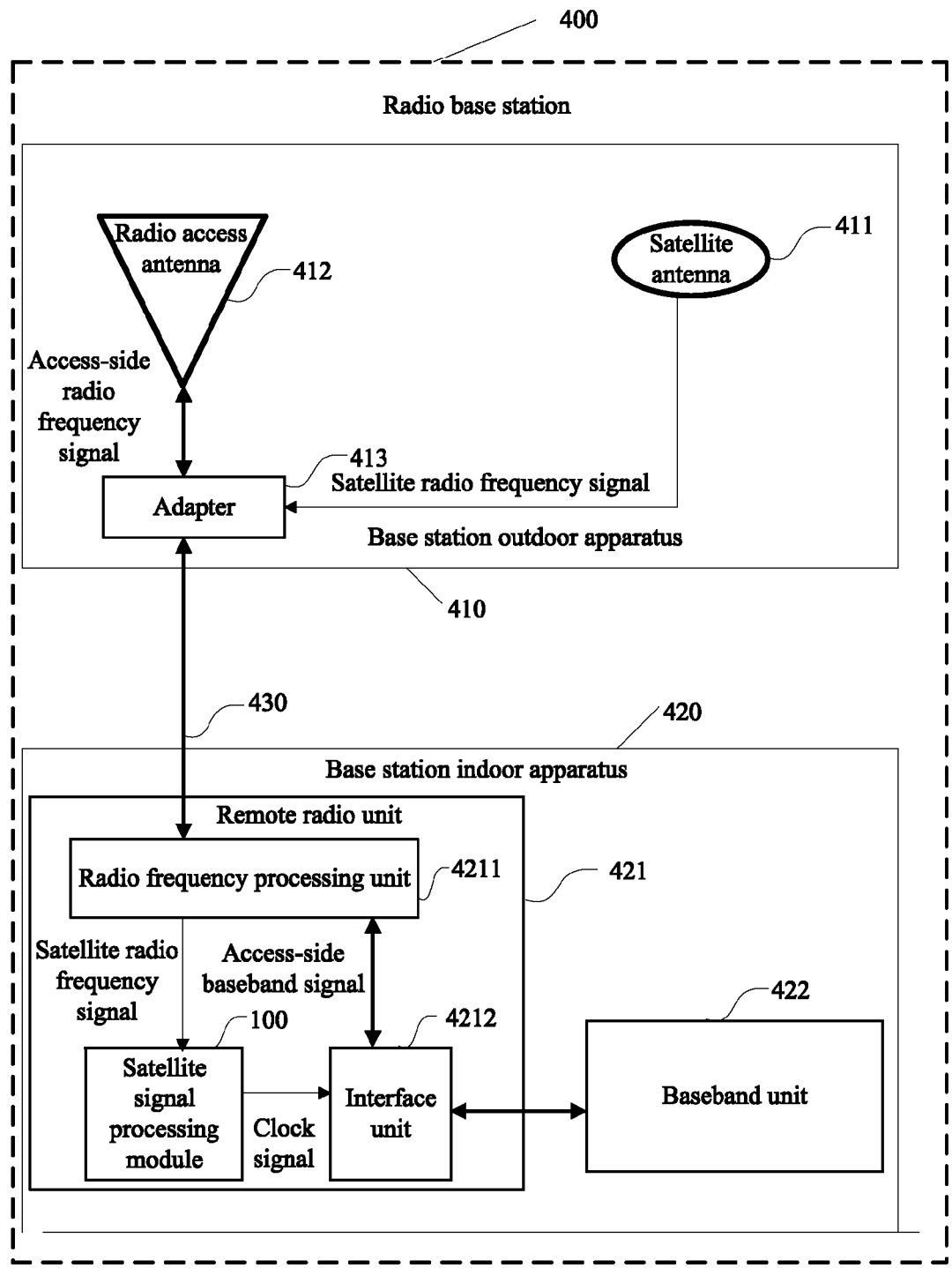
FIG. 4-b

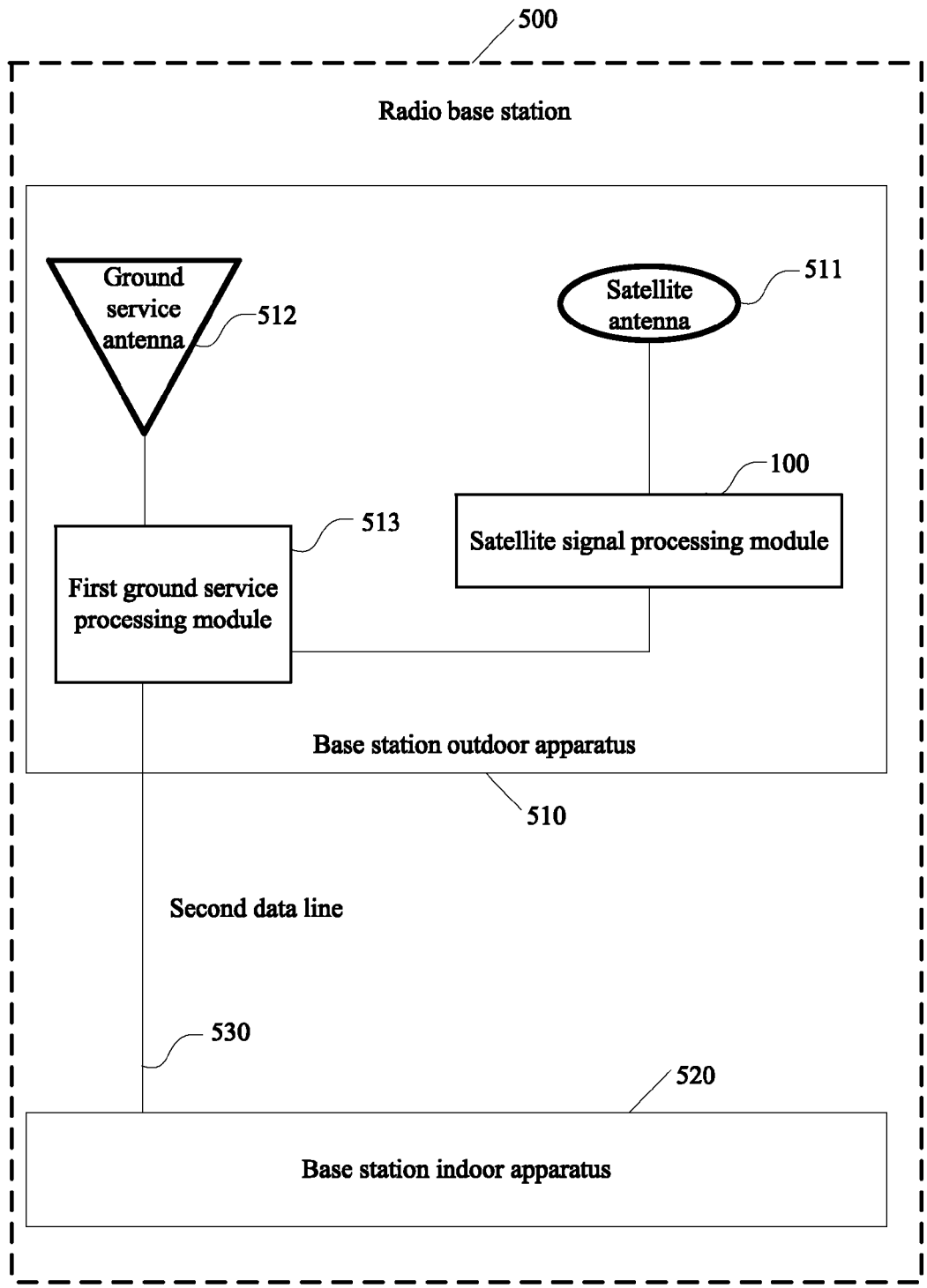
FIG. 5-a

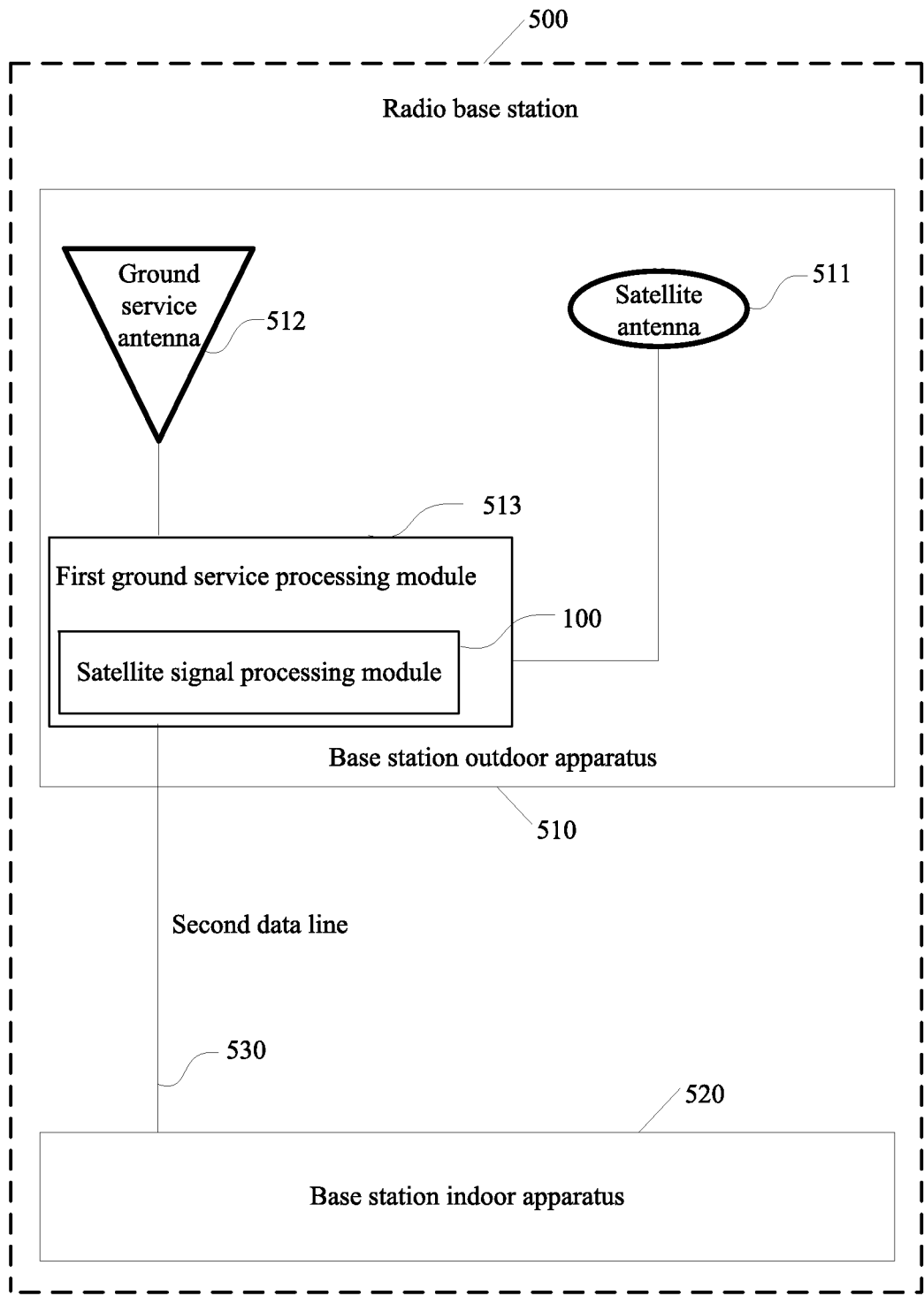
FIG. 5-b

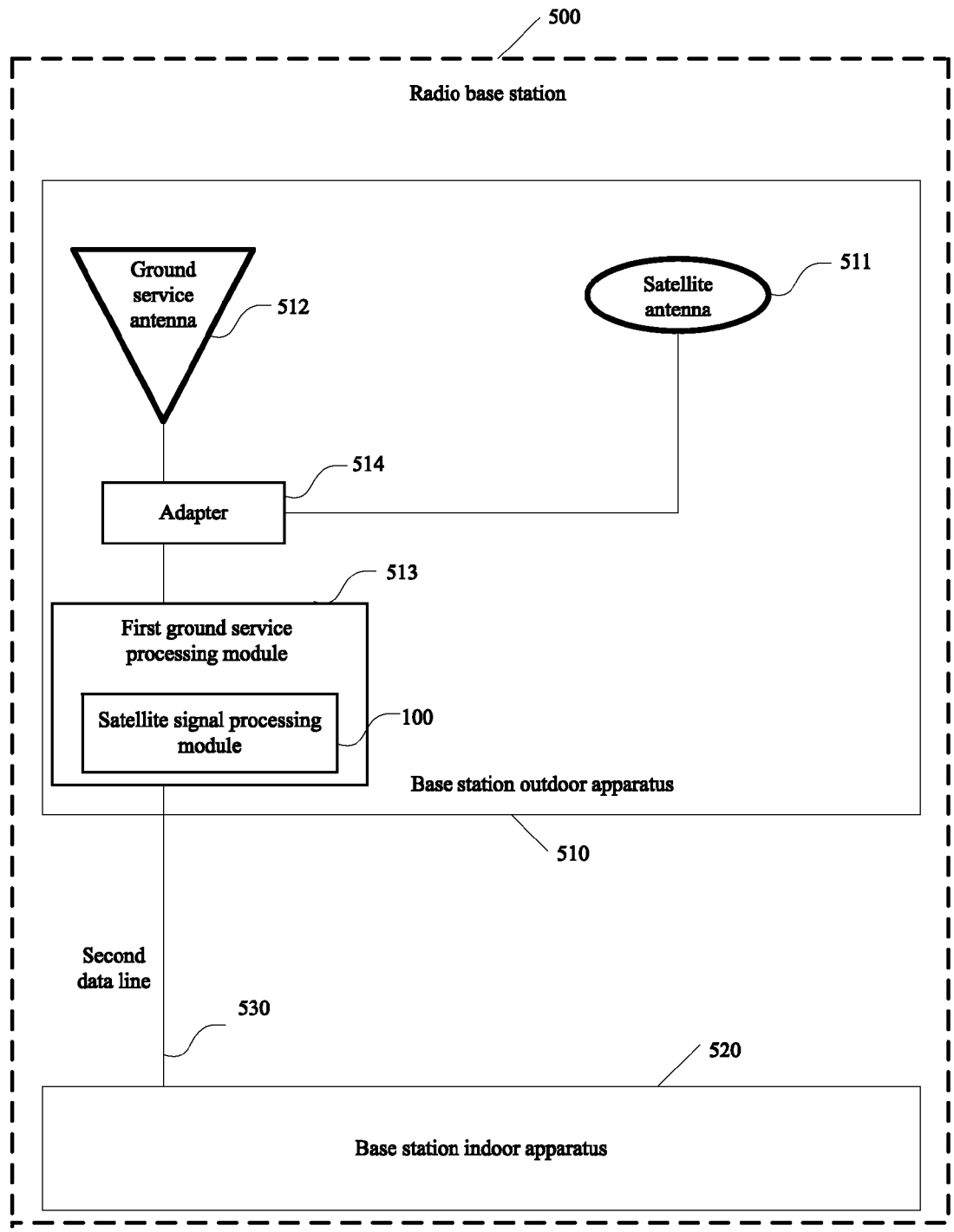
FIG. 5-c

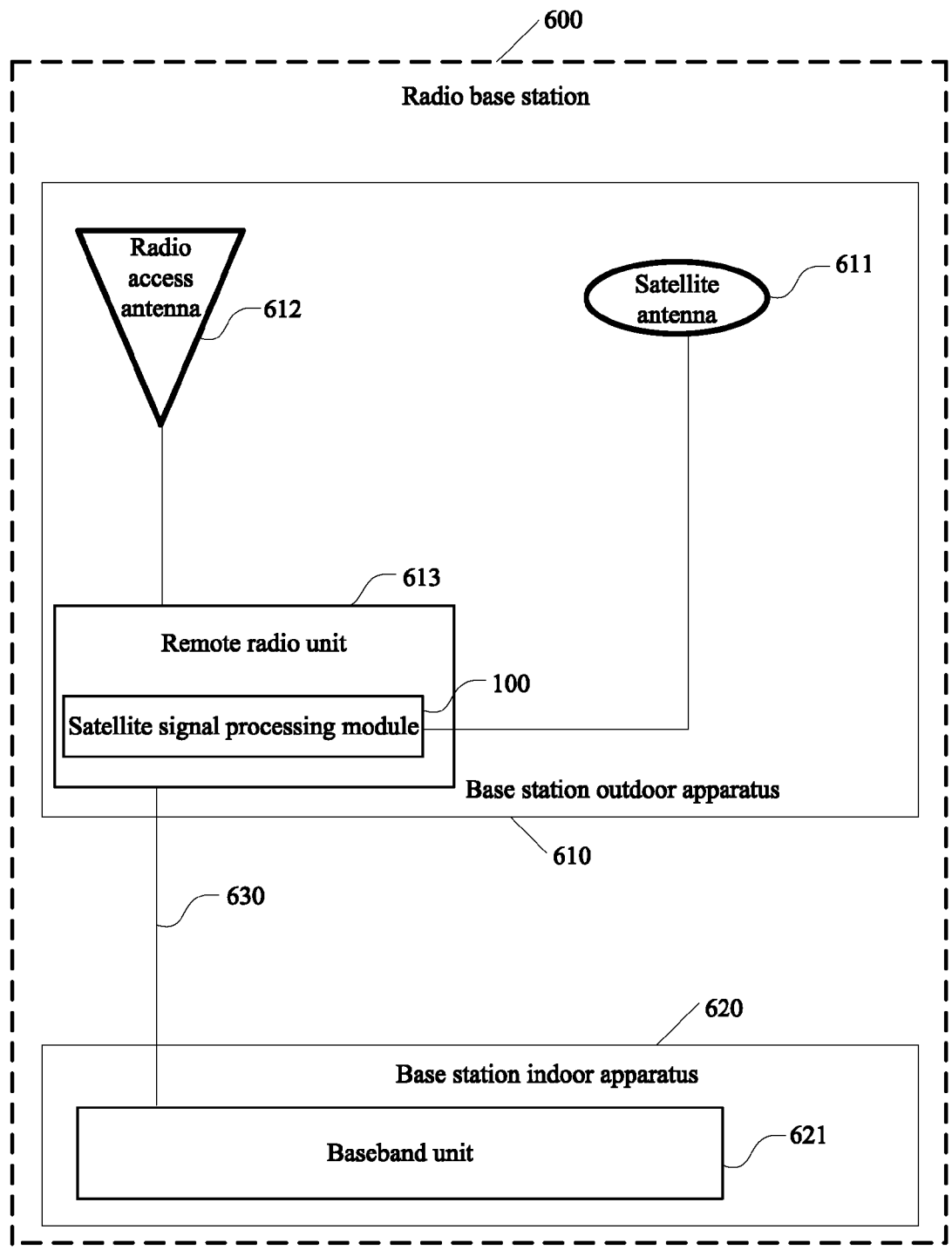
FIG. 6-a

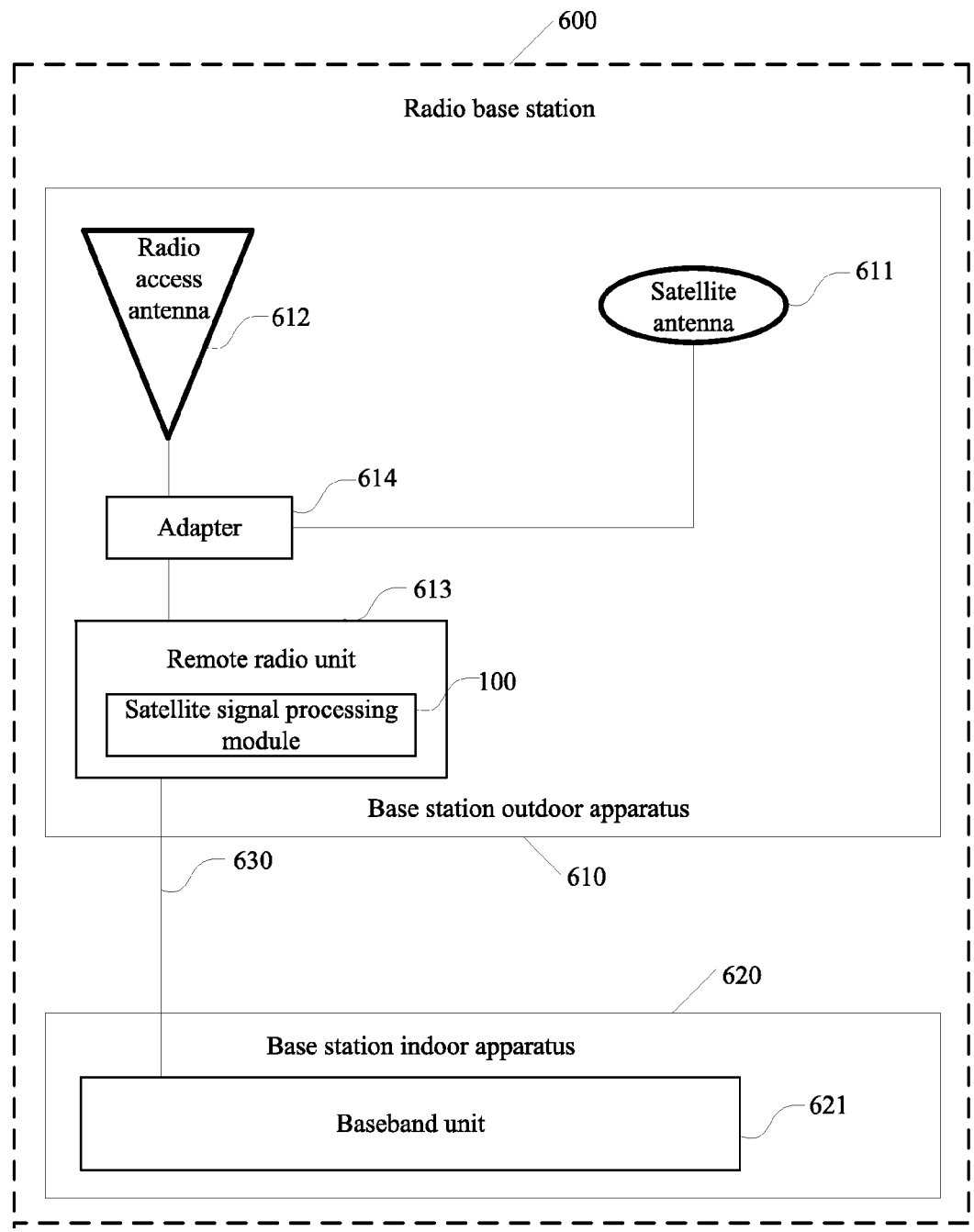
FIG. 6-b

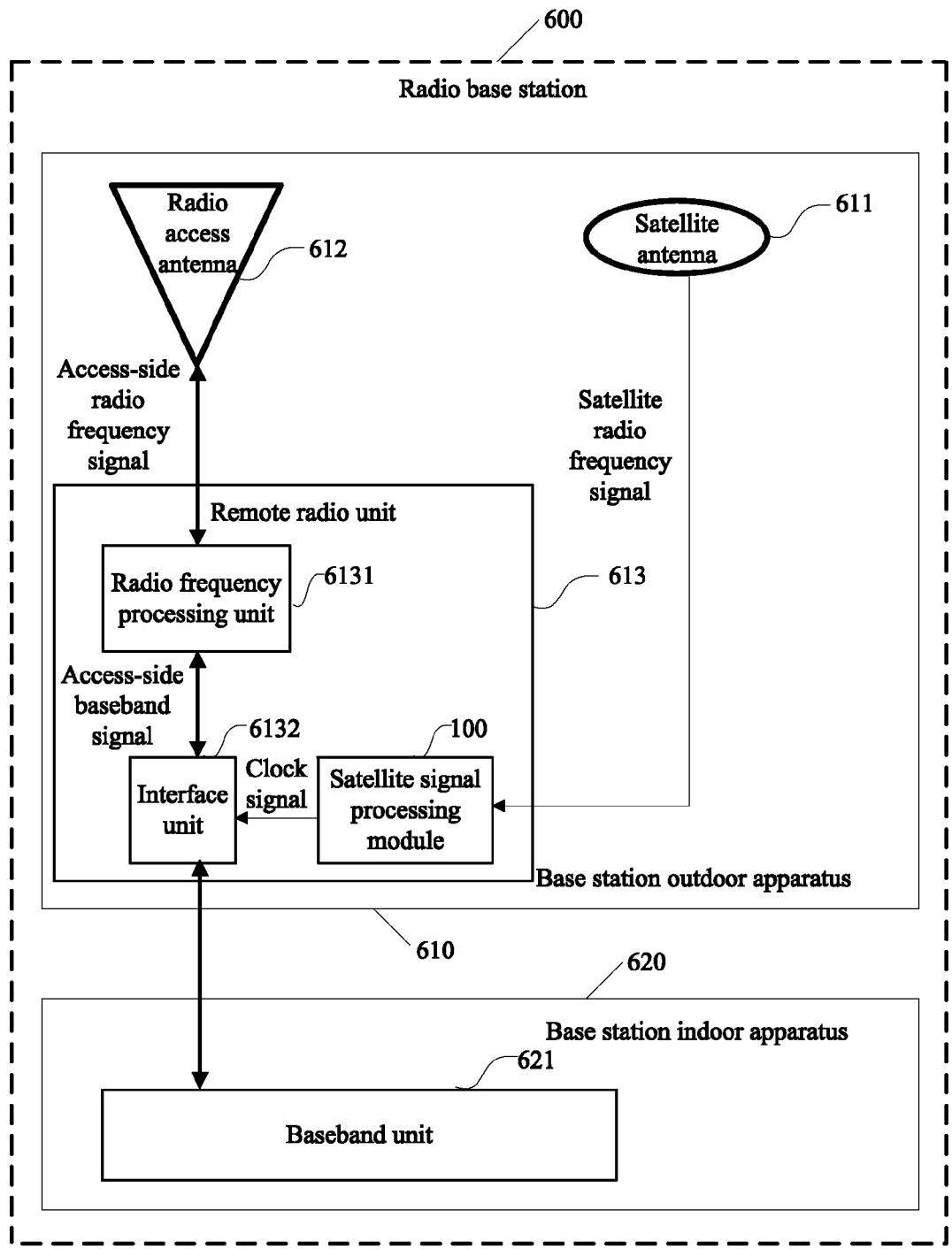
FIG. 6-c

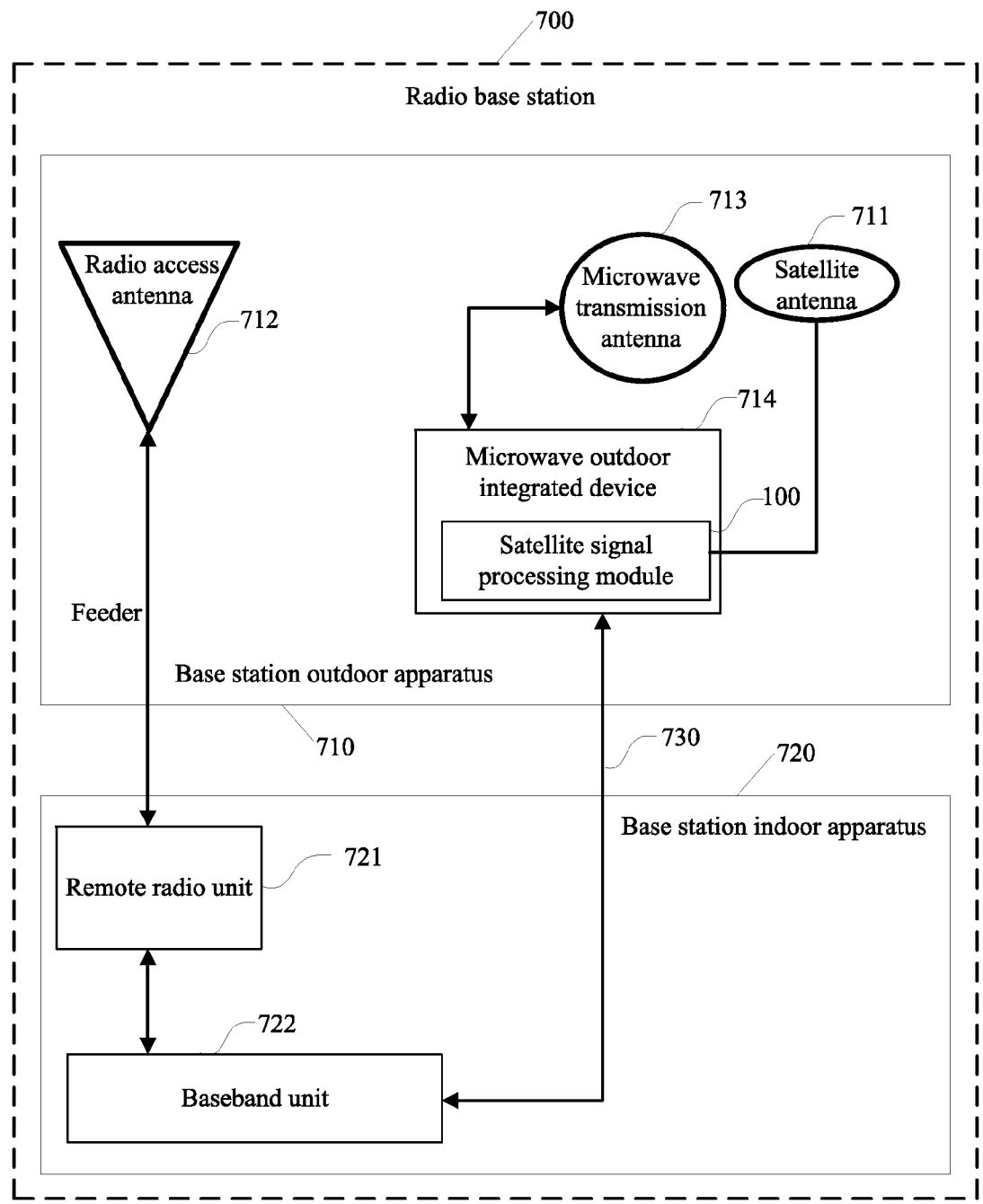
FIG. 7-a

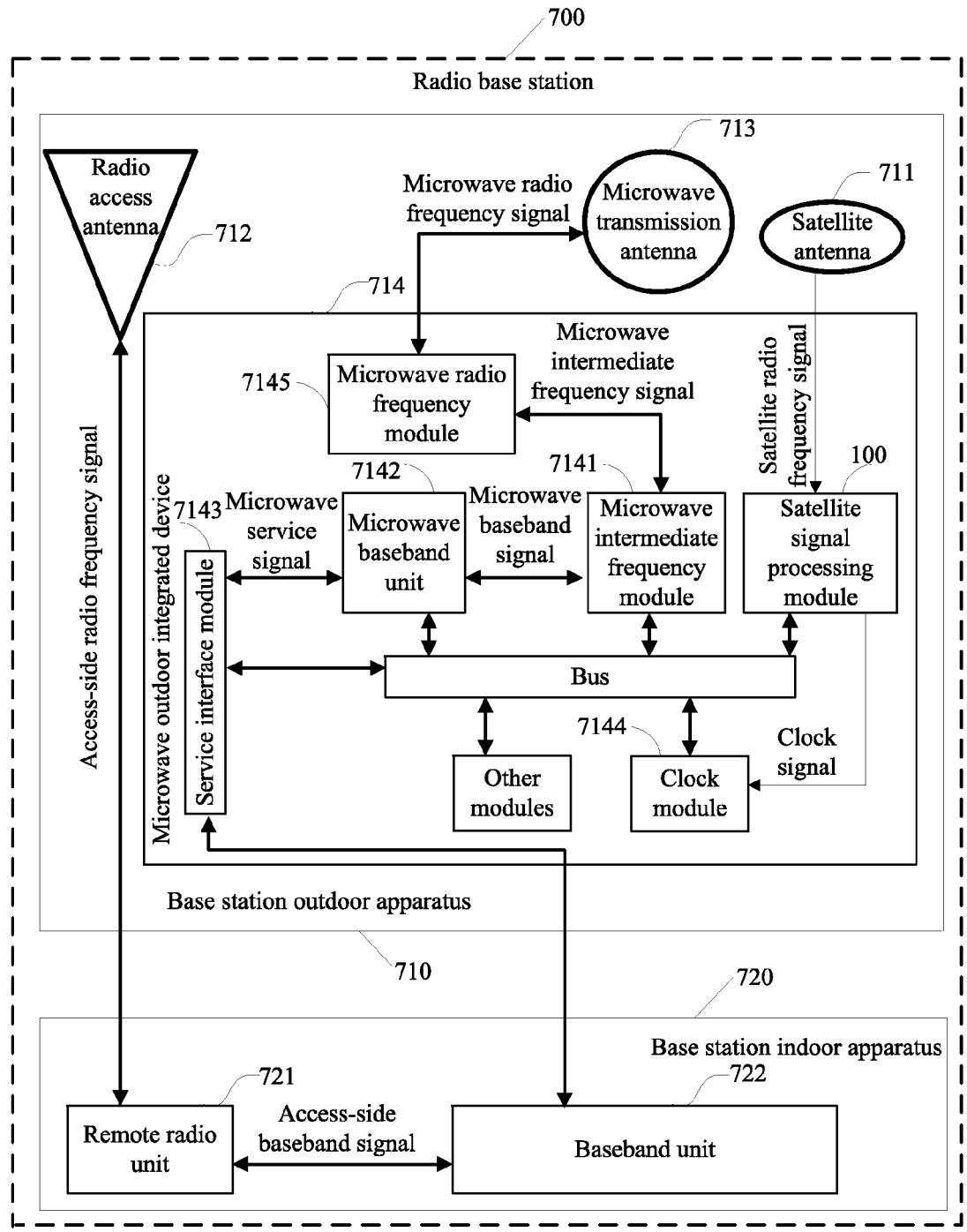
FIG. 7-b

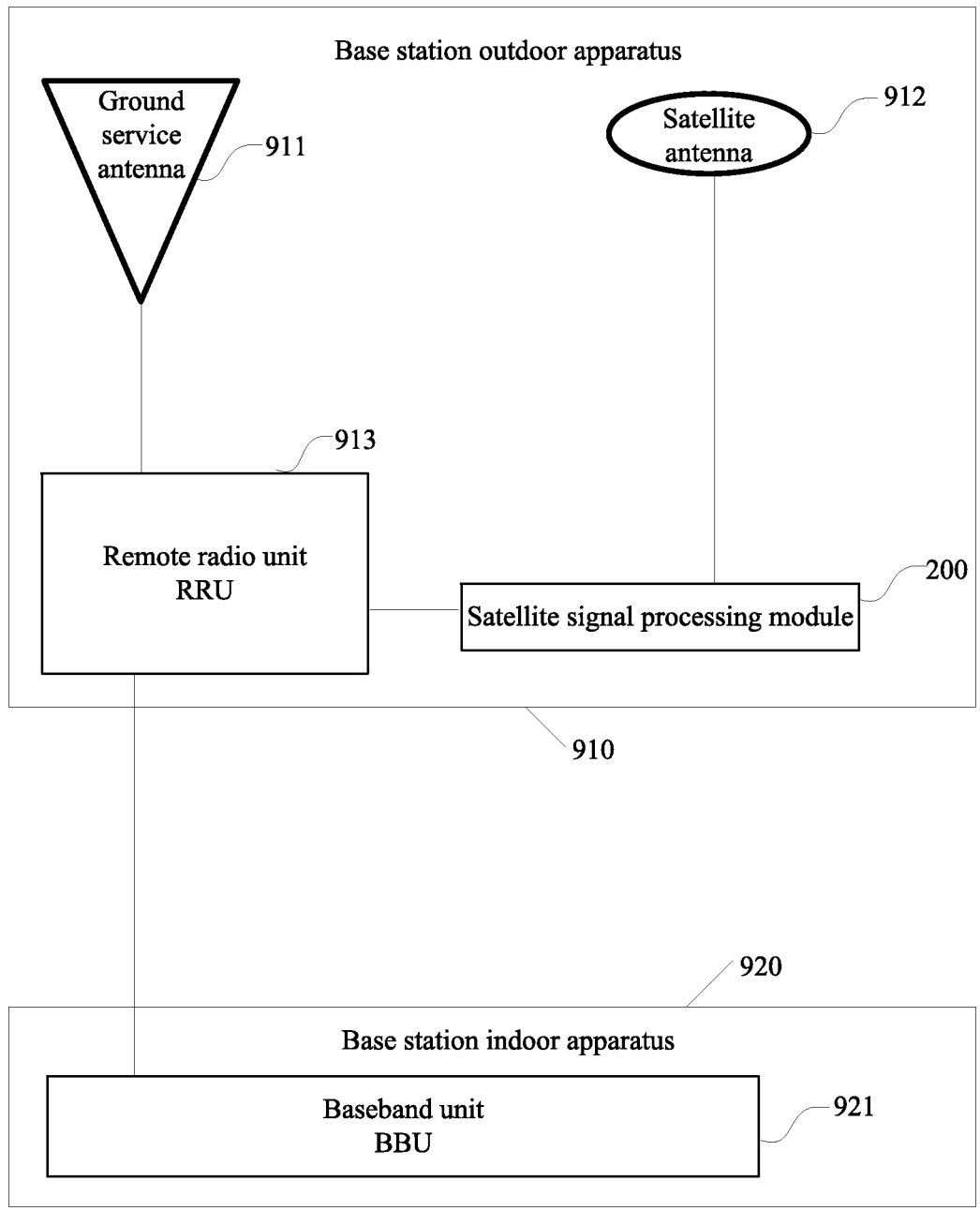
FIG. 9-a

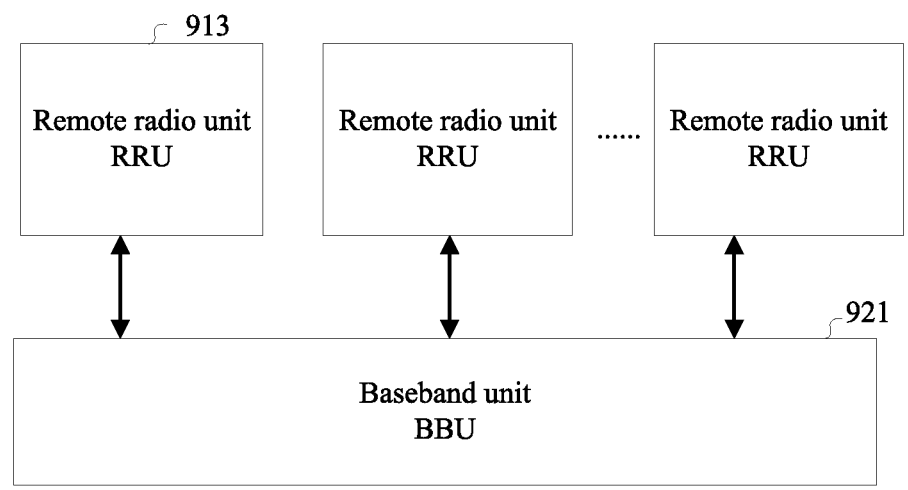
FIG. 9-b

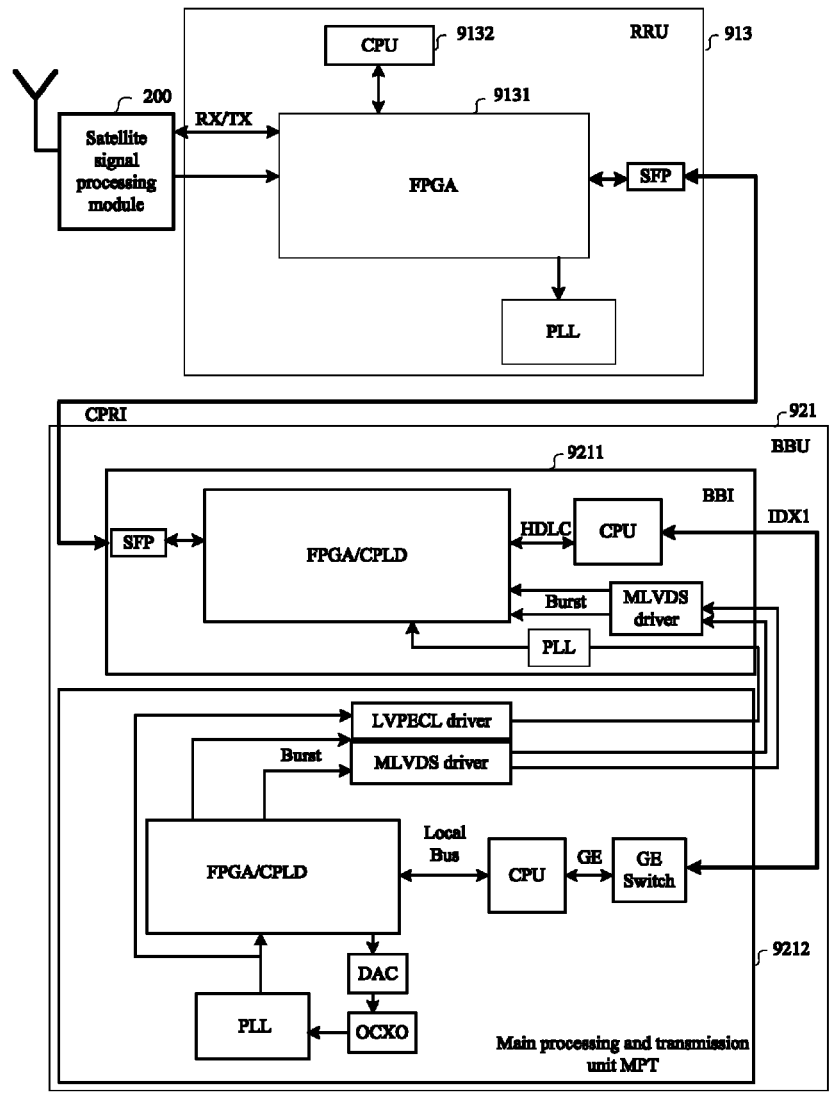
FIG. 9-c

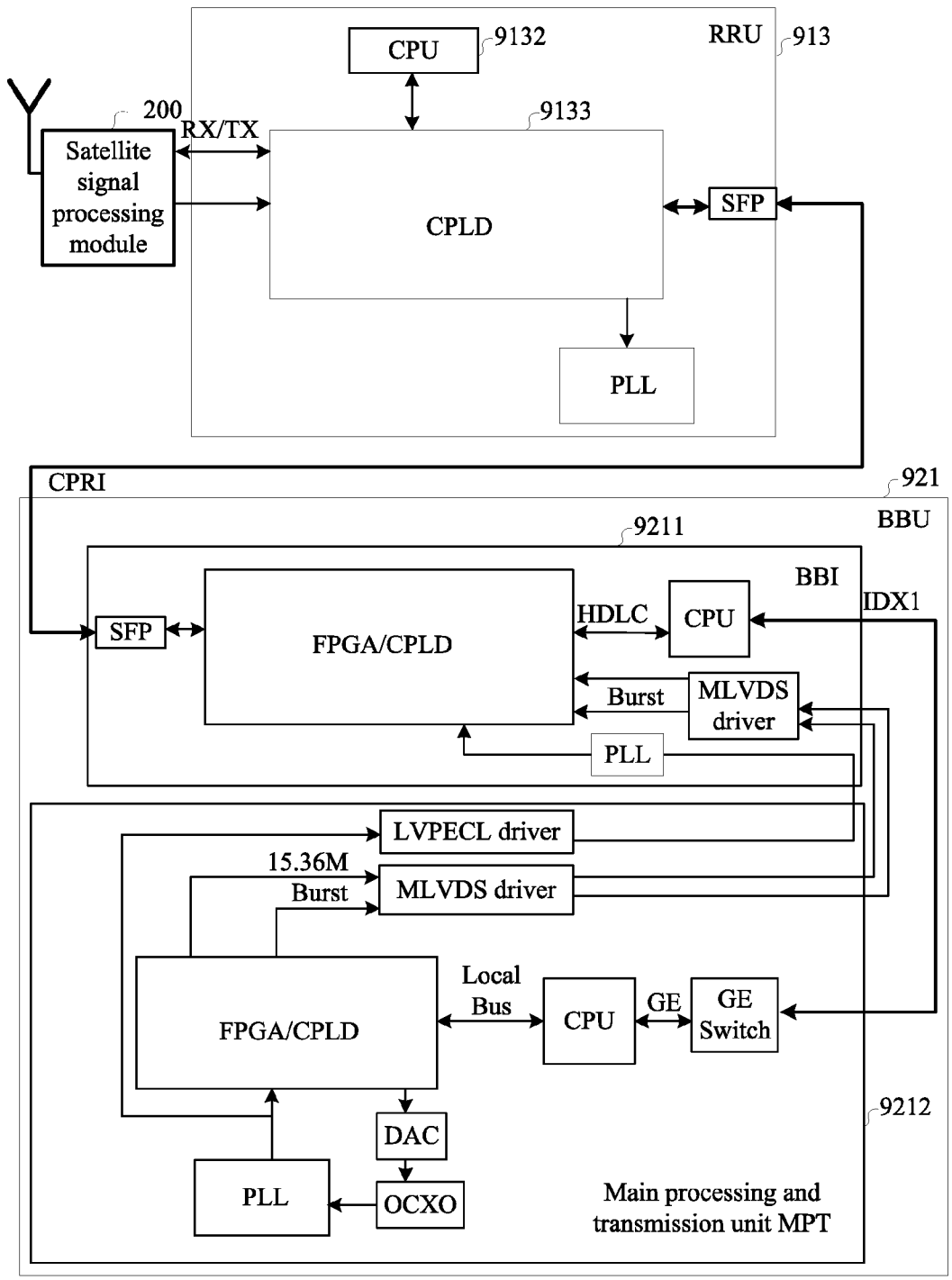
FIG. 9-d

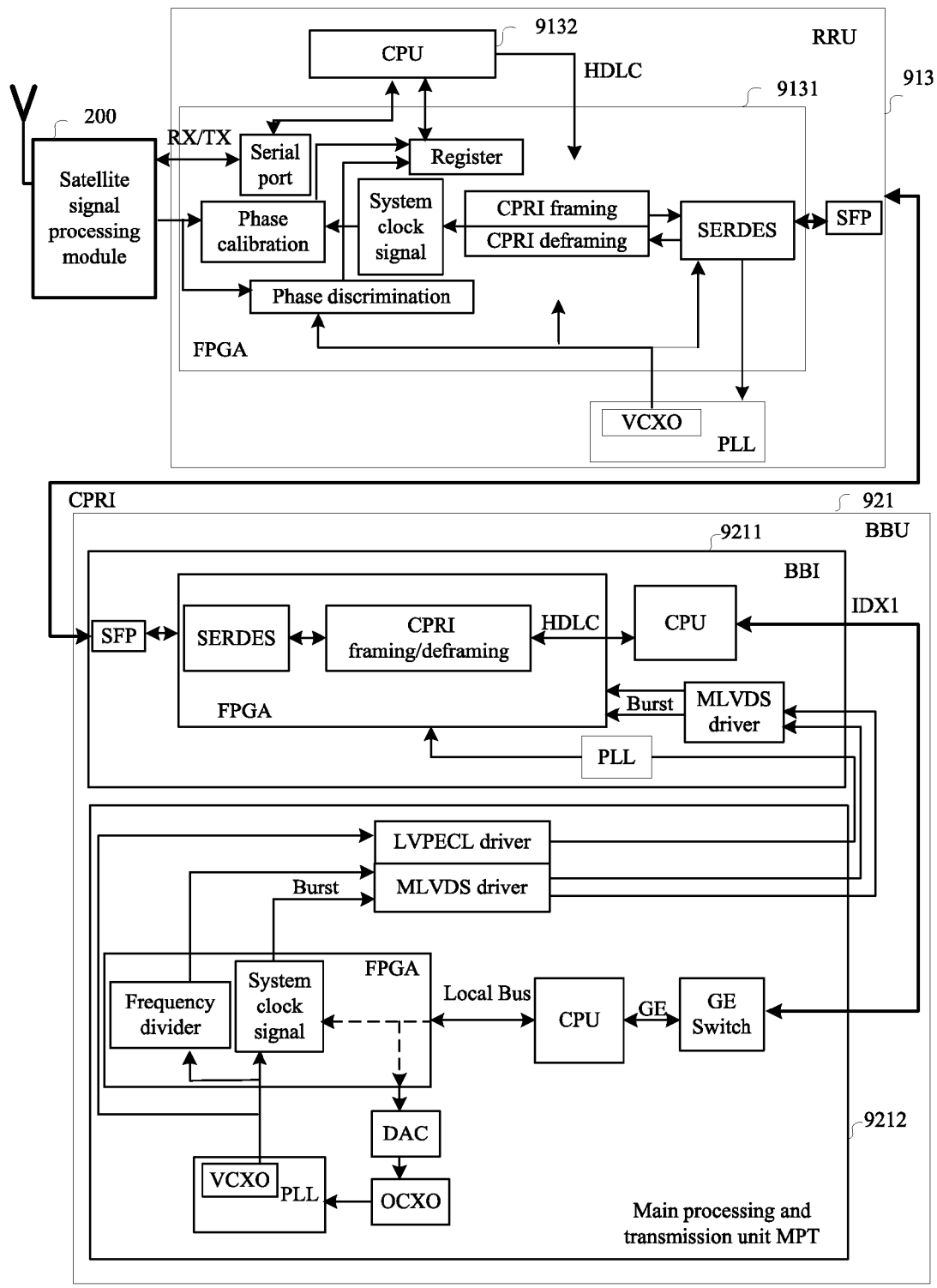
FIG. 9-e

BASE STATION AND METHOD FOR CLOCK SYNCHRONIZATION OF BASE STATION

This application is a continuation of International Application No. PCT/CN2011/074856, filed May 30, 2011, which claims priority to Chinese Patent Application No. 201010188622.3, filed May 31, 2010 and Chinese Patent Application No. 201110080928.1, filed Mar. 31, 2011, both of which applications are incorporated herein by reference.

TECHNICAL FIELD

The present invention relates to the field of communication technologies, and in particular, to a radio base station and a method for clock synchronization of the radio base station.

BACKGROUND

To meet the requirement on clock precision, a satellite receiving system is configured in some radio base stations at present, so as to use a clock signal provided by a satellite for controlling clocks of the base stations.

As shown in FIG. 1, a conventional radio base station may usually be divided into two parts: a base station indoor apparatus and a base station outdoor apparatus. The base station outdoor apparatus mainly includes a satellite antenna for receiving satellite a radio frequency signal and a radio access antenna for transmitting and receiving an access-side radio frequency signal exchanged with a terminal. The base station indoor apparatus mainly includes a baseband unit (BBU, Baseband Unit) and a remote radio unit (RRU, Remote radio unit). The BBU is mainly responsible for functions such as baseband service signal processing, main control, clock, and transmission; and the RRU is mainly responsible for functions such as radio frequency processing of transmitted and received signals. The RRU may also be deployed outdoors and referred to as a radio remote unit. A satellite receiving card is set in the baseband unit, or set indoors independently, and is mainly configured to perform decoding processing on the satellite radio frequency signal received by the satellite antenna to obtain a clock signal, so as to provide the baseband unit with the clock signal used for clock control.

In the radio base station of conventional architecture, a feeder (the length of which may be up to several meters or even over one hundred meters in some scenarios) from the base station outdoor apparatus to the base station indoor apparatus needs to be separately laid for the satellite receiving system so as to transmit the satellite signal received by the satellite antenna to the satellite receiving card for demodulation processing. The wiring is relatively complicated, and the engineering cost and cost of auxiliary materials are relatively high.

SUMMARY OF THE INVENTION

Embodiments of the present invention provide a base station and a method for clock synchronization of the base station, which help to reduce the engineering cost and cost of auxiliary materials.

In one aspect, the present invention provides a base station, including:
a base station indoor apparatus and a base station outdoor apparatus;
where, the base station outdoor apparatus includes: a ground service antenna, a satellite antenna, a satellite signal processing module configured to perform decoding processing on a satellite radio frequency signal received by the satellite antenna to obtain a reference clock source signal, and a second ground service processing module configured to perform demodulation processing on a modulation signal received by the ground service antenna;
the second ground service processing module is further configured to perform phase discrimination processing on a current system clock signal and the reference clock source signal that is obtained by the satellite signal processing module to obtain a phase difference, generate a data packet carrying the phase difference, and send the data packet to the base station indoor apparatus; and
the base station indoor apparatus includes: a third service processing module, configured to receive the data packet, obtain the carried phase difference from the data packet, and perform phase-locked tracking according to the phase difference, so as to obtain a calibrated system clock signal.

In another aspect, the present invention provides a method for clock synchronization of a base station, where the base station includes a base station indoor apparatus and a base station outdoor apparatus, and the method includes:
performing, by the base station outdoor apparatus, phase discrimination processing on a current system clock signal and a reference clock source signal that is obtained from a satellite radio frequency signal received by a satellite antenna to obtain a phase difference, generating a data packet carrying the phase difference, and sending the data packet to the base station indoor apparatus; and
receiving, by the base station indoor apparatus, the data packet, parsing the data packet to obtain the carried phase difference, and performing phase-locked tracking according to the phase difference, so as to obtain a calibrated system clock signal.

In another aspect, the present invention provides a base station, including:
a base station indoor apparatus and a base station outdoor apparatus;
where, the base station outdoor apparatus includes: a ground service antenna, a satellite antenna, a satellite signal processing module configured to perform decoding processing on a satellite radio frequency signal received by the satellite antenna to obtain a reference clock source signal, and a fourth ground service processing module configured to perform demodulation processing on a modulation signal received by the ground service antenna; and
the fourth ground service processing module is further configured to perform phase discrimination processing on a current system clock signal and the reference clock source signal that is obtained by the satellite signal processing module to obtain a phase difference, perform phase-locked tracking according to the phase difference so as to obtain a calibrated system clock signal, and send the calibrated system clock signal to a fifth service processing module in the base station indoor apparatus.

In another aspect, the present invention provides a method for clock synchronization of a base station, where the base station includes a base station indoor apparatus and a base station outdoor apparatus, and the method includes:
performing, by the base station outdoor apparatus, phase discrimination processing on a current system clock signal and a reference clock source signal that is obtained from a satellite radio frequency signal received by a satellite antenna to obtain a phase difference, performing phase-locked tracking according to the phase difference so as to obtain a calibrated system clock signal, and sending the calibrated system clock signal to the base station indoor apparatus.

As can be seen above, in a solution provided by the present invention in one aspect, in the radio base station, the satellite antenna is connected to a module in the base station outdoor apparatus, and the base station outdoor apparatus performs phase discrimination processing to obtain a phase difference, and then generates a data packet carrying the phase difference and sends the data packet to the base station indoor apparatus; and the base station indoor apparatus receives the data packet and obtains the carried phase difference from the data packet, and performs phase-locked tracking according to the phase difference so as to synchronize and calibrate the system clock signal. Because the satellite antenna is connected to the base station outdoor apparatus, it is helpful for reducing the engineering cost and cost of auxiliary materials. Because the base station outdoor apparatus performs the operations of phase discrimination processing to obtain the phase difference, and then the base station indoor apparatus performs phase-locked tracking, and synchronizes and calibrates the system clock signal, such distributed clock synchronization processing mechanism is helpful for simplify modular design of the base station indoor apparatus and enhancing the multi-scenario applicability of a distributed base station.

In another solution provided by the present invention in another aspect, in the radio base station, the satellite antenna is connected to a module in the base station outdoor apparatus, and the base station outdoor apparatus performs phase discrimination processing to obtain a phase difference; and performs phase-locked tracking according to the phase difference so as to synchronize and calibrate the system clock signal. Because the satellite antenna is connected to the base station outdoor apparatus, this is helpful for reducing the engineering cost and cost of auxiliary materials.

BRIEF DESCRIPTION OF THE DRAWINGS

To illustrate technical solutions in embodiments of the present invention and the prior art more clearly, accompanying drawings to be used in the description of the embodiments and the prior art are briefly introduced in the following. Apparently, the accompanying drawings in the following description are only some embodiments of the present invention, and persons of ordinary skill in the art can derive other drawings from these accompanying drawings without creative efforts.

FIG. 3-a is a schematic diagram of a radio base station according to a second embodiment of the present invention;

FIG. 3-b is a schematic diagram of a signal flow direction of a radio base station according to the second embodiment of the present invention;

FIG. 4-a is a schematic diagram of a radio base station according to a third embodiment of the present invention;

FIG. 4-b is a schematic diagram of a signal flow direction of a radio base station according to the third embodiment of the present invention;

FIG. 5-a is a schematic diagram of a radio base station according to a fourth embodiment of the present invention;

FIG. 5-b is a schematic diagram of another radio base station according to the fourth embodiment of the present invention;

FIG. 5-c is a schematic diagram of another radio base station according to the fourth embodiment of the present invention;

FIG. 6-a is a schematic diagram of a radio base station according to a fifth embodiment of the present invention;

FIG. 6-b is a schematic diagram of another radio base station according to the fifth embodiment of the present invention;

FIG. 6-c is a schematic diagram of a signal flow direction of a radio base station according to the fifth embodiment of the present invention;

FIG. 7-a is a schematic diagram of a radio base station according to a sixth embodiment of the present invention;

FIG. 7-b is a schematic diagram of a signal flow direction of a radio base station according to the sixth embodiment of the present invention;

FIG. 9-a is a schematic architecture diagram of another radio base station according to the seventh embodiment of the present invention;

FIG. 9-b is a schematic architecture diagram of another radio base station according to the seventh embodiment of the present invention;

FIG. 9-c is a schematic architecture diagram of another radio base station according to the seventh embodiment of the present invention;

FIG. 9-d is a schematic architecture diagram of another radio base station according to the seventh embodiment of the present invention;

FIG. 9-e is a schematic architecture diagram of another radio base station according to the seventh embodiment of the present invention.

DETAILED DESCRIPTION OF ILLUSTRATIVE EMBODIMENTS

Embodiments of the present invention provide a distributed base station and a method for clock synchronization of the distributed base station.

The embodiments of the present invention are separately described in detail in the following.

To make those skilled in the art better understand solutions of the present invention, the technical solutions provided by the embodiments of the present invention are described clearly and completely in the following with reference to accompanying drawings. Evidently, the described embodiments are only part rather than all of the embodiments of the present invention. All other embodiments, which are obtained by Persons of ordinary skill in the art can based on the embodiments of the present invention without creative efforts, shall fall within the protection scope of the present invention.

Embodiment 1

Figure 1:
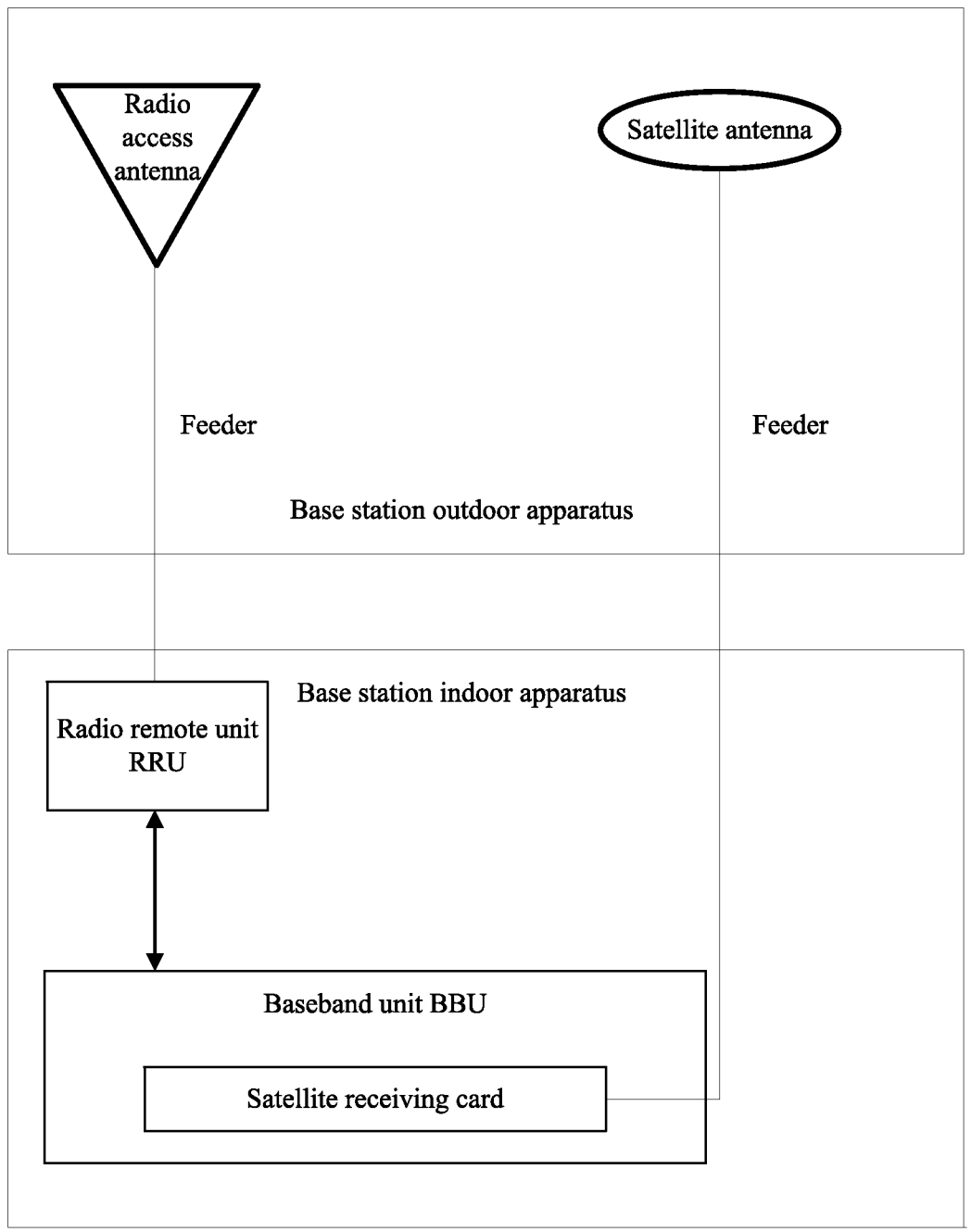
FIG. 1 is a schematic diagram of a radio base station in the prior art.
Figure 2:
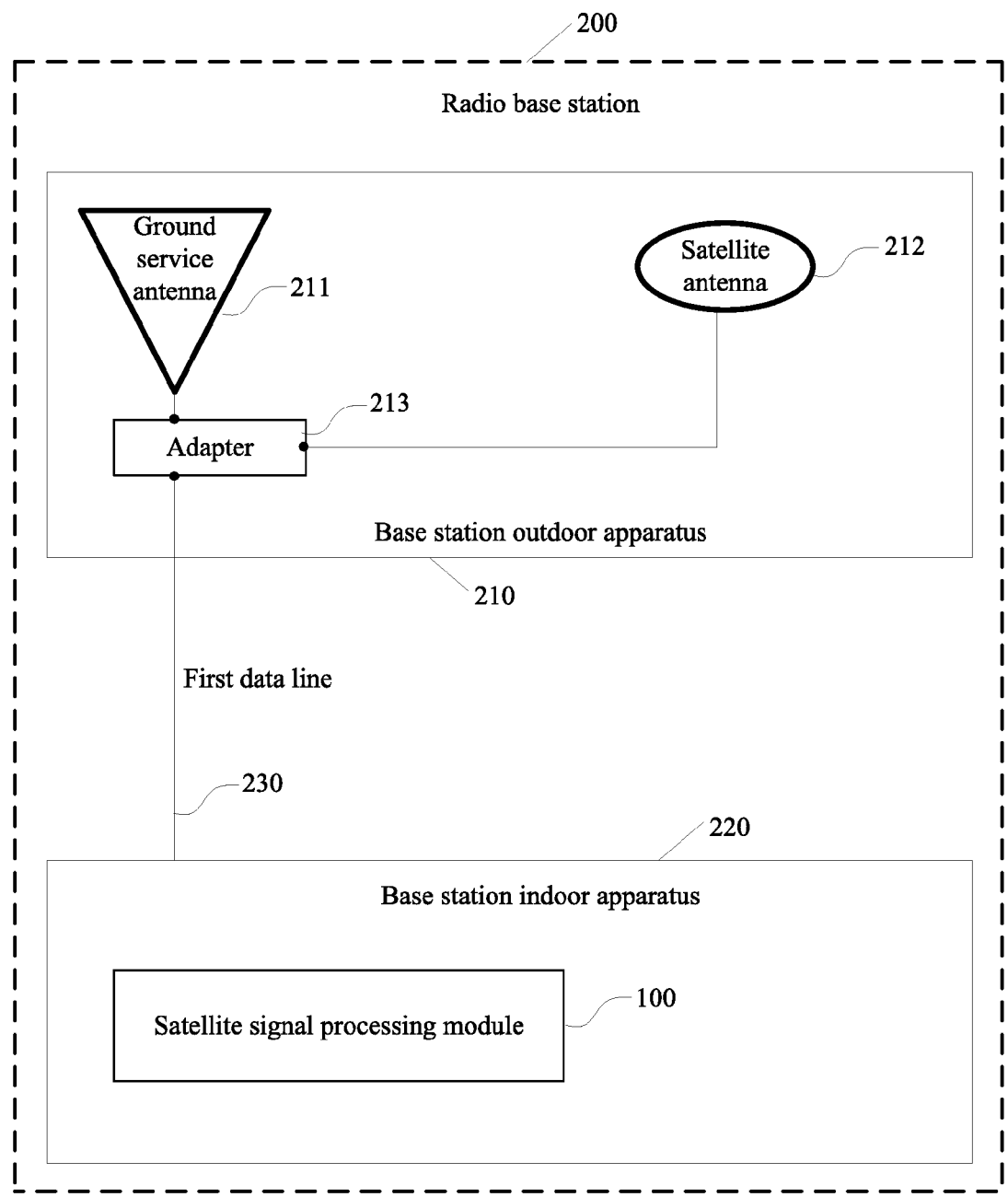
FIG. 2 is a schematic diagram of a radio base station according to a first embodiment of the present invention.

Referring to FIG. 2, in an embodiment of a radio base station provided by an embodiment of the present invention, a radio base station 200 may include a base station outdoor apparatus 210 and a base station indoor apparatus 220.

The base station outdoor apparatus 210 may include a ground service antenna 211, a satellite antenna 212, and an adapter 213.

The ground service antenna 211 may be a microwave transmission antenna or a radio access antenna.

The base station indoor apparatus 220 may include a satellite signal processing module 100 configured to perform decoding processing on a satellite radio frequency signal received by the satellite antenna 212 to obtain a satellite service signal.

The satellite radio frequency signal received by the satellite antenna 212 is transmitted to the base station indoor apparatus 220 through a first data line 230, and a modulation signal received by the ground service antenna 211 is transmitted to the base station indoor apparatus 220 through the first data line 230.

In an application scenario, the satellite antenna 212 and the ground service antenna 211 may be connected to the adapter 213, and the adapter 213 is connected to the base station indoor apparatus 220 through the first data line 230. The adapter 120 may couple the satellite radio frequency signal received by the satellite antenna 212 and the modulation signal received by the ground service antenna 211 into a signal (the adapter may perform necessary impedance matching processing on the signal), and transmit the coupled signal to the base station indoor apparatus 220 through the first data line 230, so that the signals of two antennas are transmitted from the base station outdoor apparatus 210 to the base station indoor apparatus 220 through one data line, which thereby simplifies wiring of a feeder from the base station outdoor apparatus to the base station indoor apparatus.

The first data line 230 may be a feeder or a signal transmission line of another type.

The base station indoor apparatus 220 performs decoupling after receiving the coupled signal, and processes, through corresponding processing circuits, the signal received by the satellite antenna and the signal received by the ground service antenna; for example, may process, through the satellite signal processing module 100, the signal received by the satellite antenna, and process, through the microwave or radio processing circuit, the signal received by the ground service antenna.

It can be understood that because the signals of two antennas are transmitted from the base station outdoor apparatus 210 to the base station indoor apparatus 220 through one data line, a lightning protection circuit may be shared to perform lightning protection on the two antennas, which may save the number of lightning protection circuits in comparison with the prior art.

In an application scenario, if the ground service antenna 211 is a radio access antenna, the satellite signal processing module 100 may be set in a remote radio unit RRU of the base station indoor apparatus 220.

An interface between a BBU and the RRU may be of any type. In this embodiment, the interface between the BBU and the RRU is, for example, a common public radio interface (CPRI, Common Public Radio Interface) or an open base station architecture initiative (OBSAI, Open Base Station Architecture Initiative) interface or an interface of another type, and a physical carrier of the interface may be an optical fiber or a conductor.

Data transmission between network-side devices such as the radio base station and a base station controller in the embodiment of the present invention may also be wireless transmission such as microwave transmission in addition to wired transmission such as optical fiber transmission.

A microwave transmission device may include a microwave outdoor unit (ODU for short, mainly configured to perform frequency conversion processing on transmitted and received signals, including: converting a microwave radio frequency signal received by a microwave transmission antenna into a microwave intermediate frequency signal; and converting the microwave intermediate frequency signal to be sent into a microwave radio frequency signal) and a microwave indoor unit (IDU for short, mainly configured to perform baseband processing on the transmitted and received signals, including: performing baseband processing on the received microwave intermediate frequency signal to obtain a microwave service signal; and performing baseband processing on the microwave service signal to be sent to obtain a microwave intermediate frequency signal), or a microwave outdoor integrated device (that is, all microwave transmission devices are arranged in the outdoor apparatus of the base station).

In an application scenario, if the ground service antenna 211 is a microwave transmission antenna, the satellite signal processing module 100 may be set in a microwave indoor unit of the base station indoor apparatus 220.

It should be noted that the satellite signal processing module 100 in the embodiment of the present invention may be, for example, a satellite receiving card, or another apparatus with a similar function.

In an application scenario, the satellite service signal that is obtained by the satellite signal processing module 100 through decoding processing on the satellite radio frequency signal includes: a clock signal (the clock signal may include, for example, a reference clock source signal, and may further include satellite absolute time information) and/or a position signal. In the embodiment of the present invention, specific illustration is mainly directed to a case that the satellite service signal is a clock signal.

If the satellite signal processing module 100 obtains a clock signal through decoding processing, the satellite signal processing module 100 may provide the clock signal for the baseband unit of the base station indoor apparatus 220, so that the baseband unit uses the clock signal to perform clock calibration and control and so on.

In the embodiment of the present invention, the satellite antenna may receive the satellite radio frequency signal from satellites such as the Galileo satellite, global positioning system (GPS, Global Positioning System) satellite, BeiDou satellite, or global navigation satellite system (GLONASS, Global Navigation Satellite System) satellite.

As can be seen above, in this embodiment, the satellite signal processing module is set in the base station indoor apparatus, and signals of the satellite antenna and at least one other antenna are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

Embodiment 2

This embodiment is mainly illustrated by using an example in which a satellite signal processing module is set in a microwave indoor unit of a base station indoor apparatus.

Referring to FIG. 3-*a*, in an embodiment of a radio base station provided by the embodiment of the present invention, a radio base station 300 may include a base station outdoor apparatus 310 and a base station indoor apparatus 320.

The base station indoor apparatus 310 may include: a satellite antenna 311, a radio access antenna 312, a microwave transmission antenna 313, a microwave outdoor unit 314, an adapter 315 (the adapter 315 may also be set in the microwave outdoor unit 314) and so on. The base station indoor apparatus 320 may include: a remote radio unit 321, a baseband unit 322, a microwave indoor unit 323, a satellite signal processing module 100 and so on. The satellite signal processing module 100 may be set in the microwave indoor unit 323.

The radio access antenna 312 is connected to the remote radio unit 321 through a feeder, and the remote radio unit 321 is connected with the baseband unit 322 through a CPRI interface or an OBSAI interface. The remote radio unit 321 performs radio frequency processing on an access-side radio frequency signal received by the radio access antenna 312 to obtain an access-side baseband signal, and outputs the access-side baseband signal to the baseband unit 322 for baseband processing; the baseband unit 322 may also output the access-side baseband signal to be sent to the remote radio unit 321, and the remote radio unit 321 performs radio frequency processing on the access-side baseband signal to be sent to obtain an access-side radio frequency signal, and transmits the access-side radio frequency signal through the radio access antenna 312.

The satellite antenna 311 is connected to the adapter 315; the microwave transmission antenna 313 is connected to the adapter 315 through the microwave outdoor unit 314; the microwave outdoor unit 314 performs frequency conversion processing on a microwave radio frequency signal received by the microwave transmission antenna 313 to obtain a microwave intermediate frequency signal, and the microwave outdoor unit 314 outputs the microwave intermediate frequency signal to the adapter 315. The adapter 315 is connected to the microwave indoor unit 323 in the base station indoor apparatus 320 through a feeder 330; the adapter 315 performs coupling on a satellite radio frequency signal and the microwave intermediate frequency signal that is from the microwave outdoor unit 314 to obtain a coupled signal (the adapter may perform necessary impedance matching on the signal), and the coupled signal is transmitted to the microwave indoor unit 323 through the feeder 330.

Examples of parameters of the microwave intermediate frequency signal and the satellite radio frequency signal may be as shown in the following:

| Microwave Intermediate Signal | Transmit frequency (MHz) | 350 |
|---|---|---|
| | Receive frequency (MHz) | 140 |
| | Impedance (ohm) | 50 |
| Satellite Radio Frequency Signal | Receive frequency (GHz) | 1.5/2.4 |
| | Impedance (ohm) | 50 |

The microwave indoor unit 323 separates the satellite radio frequency signal and the microwave intermediate frequency signal in the coupled signal, performs demodulation and baseband processing on the separated microwave intermediate frequency signal to obtain a microwave service signal, and outputs the separated satellite radio frequency signal to the satellite signal processing module 100. The satellite signal processing module 100 perform decoding processing on the received satellite radio frequency signal to obtain a satellite service signal (which may include a clock signal, where the clock signal may include, for example, a reference clock source signal, and may further include satellite absolute time information). The microwave indoor unit 323 performs corresponding signal format conversion (such as the Ethernet (Ethernet) format, plesiochronous digital hierarchy (PDH, Plesiochronous Digital Hierarchy) format, and synchronous digital hierarchy (SDH, Synchronous Digital Hierarchy) format) on the satellite service signal and the microwave service signal, and outputs the service signal with the format converted to the baseband unit 322 for processing.

If the satellite signal processing module 100 performs decoding processing on the satellite radio frequency signal to obtain a clock signal, the microwave indoor unit 323 may use the clock signal to calibrate a clock of the microwave service signal. The baseband unit 322 may extract a clock signal from the microwave service signal with the clock calibrated (it is can be understood that because the microwave indoor unit 323 performs clock calibration on the microwave service signal by using the clock signal which is obtained by the satellite signal processing module 100 through decoding processing on the satellite radio frequency signal, the clock signal extracted by the baseband unit 322 from the microwave service signal with the clock calibrated may be equivalent to the clock signal which is obtained by the satellite signal processing module 100 through decoding processing on the satellite radio frequency signal), and uses the clock signal to perform clock calibration and control and so on.

Referring to FIG. 3-b, in an application scenario, the microwave indoor unit 323 may include: a microwave intermediate frequency module 3231, a microwave baseband module 3232, a service interface module 3233, a clock module 3234 and so on.

For example, the satellite radio frequency signal carries a clock signal; flow directions of signals and a working manner of each module in the base station 300 may be as follows.

The satellite antenna 311 receives the satellite radio frequency signal and outputs the satellite radio frequency signal to the adapter 315 through a feeder; the microwave transmission antenna 313 receives the microwave radio frequency signal and outputs the microwave radio frequency signal to the microwave outdoor unit 314 through a feeder; the microwave outdoor unit 314 performs frequency conversion processing on the microwave radio frequency signal to obtain a microwave intermediate frequency signal; and the microwave outdoor unit 314 outputs the microwave intermediate frequency signal to the adapter 315. The adapter 315 couples the satellite radio frequency signal and the microwave intermediate frequency signal, and outputs the coupled signal of the satellite radio frequency signal and microwave intermediate frequency signal to the microwave indoor unit 323 of the base station indoor apparatus 320. The microwave intermediate frequency module 3231 of the microwave indoor unit 323 receives the coupled signal of the satellite radio frequency signal and microwave intermediate frequency signal, separates the satellite radio frequency signal and microwave intermediate frequency signal in the coupled signal, and outputs the separated satellite radio frequency signal to the satellite signal processing module 100. The satellite signal processing module 100 performs decoding processing on the received satellite radio frequency signal to obtain a clock signal (the clock signal may include, for example, a reference clock source signal, and may further include satellite absolute time information), and provides the clock signal for the clock module 3234. The clock module 3234 uses the clock signal to calibrate its clock, and performs clock control on another module of the microwave indoor unit 323. The microwave intermediate frequency module 3231 also converts the separated microwave intermediate frequency signal into a microwave baseband signal, and outputs the microwave baseband signal to the microwave baseband module 3232; the microwave baseband module 3232 performs, under the clock control of the clock module 3234, baseband service processing on the microwave baseband signal to obtain the corresponding microwave service signal; the service interface module 3233 performs corresponding format conversion on the microwave service signal that is obtained by the microwave baseband module 3232 through processing, and outputs the microwave service signal with the format converted to the baseband unit 322. It can be understood that because the clock module 3234 calibrates its clock by using the clock signal which is obtained by the satellite signal processing module 100 through decoding processing on the received satellite radio frequency signal, while the microwave intermediate frequency module 3231, microwave baseband module 3232, and service interface module 3233 all process microwave signals under clock control of the clock module 3234, the clock of the microwave service signal received by the baseband unit 322 is synchronous with a satellite. The baseband unit 322 may extract a clock signal (equivalent to the clock signal which is obtained by the satellite signal processing module 100 through decoding processing on the satellite radio frequency signal) from the microwave service signal of the microwave indoor unit 323, and use the clock signal to perform clock calibration and control and so on.

As can be seen above, in this embodiment, the satellite signal processing module is set in the microwave indoor unit of the base station indoor apparatus, and the signals of the satellite antenna and microwave transmission antenna are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

Embodiment 3

This embodiment is illustrated mainly by using an example in which the satellite signal processing module is set in a remote radio unit of the base station indoor apparatus.

Referring to FIG. 4-*a*, in another embodiment of a radio base station provided by the embodiment of the present invention, a radio base station 400 may include a base station outdoor apparatus 410 and a base station indoor apparatus 420.

The base station outdoor apparatus 410 may include: a satellite antenna 411 for receiving a satellite radio frequency signal, a radio access antenna 412 for receiving an access-side radio frequency signal, and an adapter 413.

The base station indoor apparatus 420 may include: a remote radio unit 421, a baseband unit 422, and a satellite signal processing module 100. The satellite signal processing module 100 is set in the remote radio unit 421.

The satellite antenna 411 and the radio access antenna 412 are connected to the adapter 413; the adapter 413 is connected to the remote radio unit 421 of the base station indoor apparatus 420 through a feeder 430; the adapter 413 performs coupling on the satellite radio frequency signal and the access-side radio frequency signal to obtain a coupled signal (the adapter may perform necessary impedance matching on the signal), and transmits the coupled signal to the remote radio unit 421 through the feeder 430.

Examples of parameters of the access-side radio frequency signal and the satellite radio frequency signal may be as shown in the following:

| | | |
|---|---|---|
| Access-side Radio Frequency Signal | Transmit frequency (DHz) Receive frequency (MHz) | 0.7/0.9/1.8/2.1/... |
| | Impedance (ohm) | 50 |
| Satellite Radio Frequency Signal | Receive frequency (GHz) | 1.5/2.4 |
| | Impedance (ohm) | 50 |

The remote radio unit 421 receives the coupled signal of the satellite radio frequency signal and access-side radio frequency signal, separates the satellite radio frequency signal and access-side radio frequency signal in the coupled signal, performs radio frequency processing on the separated access-side radio frequency signal to obtain an access-side baseband signal, and outputs the separated satellite radio frequency signal to the satellite signal processing module 100. The satellite signal processing module 100 performs decoding processing on the received satellite radio frequency signal to obtain a satellite service signal (which may include a clock signal, where the clock signal may include, for example, a reference clock source signal, and may further include satellite absolute time information). The remote radio unit 421 embeds the satellite service signal into the access-side baseband signal, performs interface format conversion (for example, a CPRI interface or an OBSAI interface format), and outputs the access-side baseband signal with the interface format converted to the baseband unit 422. The baseband unit 422 extracts the satellite service signal embedded in the access-side baseband signal, and performs baseband processing on the access-side baseband signal.

If the satellite signal processing module 100 performs decoding processing on the satellite radio frequency signal to obtain a clock signal, the baseband unit 422 may extract the clock signal embedded in the access-side baseband signal (equivalent to the clock signal which is obtained by the satellite signal processing module 100 through decoding processing on the satellite radio frequency signal, where the clock signal may include, for example, a reference clock source signal, and may further include satellite absolute time information), and use the clock signal to perform clock calibration and control and so on.

Referring to FIG. 4-*b*, in an application scenario, the remote radio unit 421 may include a radio frequency processing unit 4211 and an interface unit 4212.

For example, the satellite radio frequency signal carries a clock signal; flow directions of signals and a working manner of each module in the base station 400 may be as follows.

The satellite antenna 411 receives the satellite radio frequency signal and outputs the satellite radio frequency signal to the adapter 413 through a feeder; the radio access antenna 412 receives the access-side radio frequency signal and outputs the access-side radio frequency signal to the adapter 413. The adapter 413 couples the satellite radio frequency signal and the access-side radio frequency signal, and outputs the coupled signal of the satellite radio frequency signal access-side radio frequency signal to the remote radio unit 421 of the base station indoor apparatus 420. The radio frequency processing unit 4211 of the remote radio unit 421 receives the coupled signal of the satellite radio frequency signal and access-side radio frequency signal, and separates the satellite radio frequency signal and access-side radio frequency signal in the coupled signal. The radio frequency processing unit 4211 converts, through frequency conversion processing, the separated access-side radio frequency signal into an access-side baseband signal, and outputs the access-side baseband signal to the interface unit 4212; the radio frequency processing unit 4211 outputs the separated satellite radio frequency signal to the satellite signal processing module 100. The satellite signal processing module 100 performs decoding processing on the received satellite radio frequency signal to obtain a clock signal (the clock signal may include, for example, a reference clock source signal, and may further include satellite absolute time information), and outputs the clock signal to the interface unit 4212. The interface unit 4212 embeds the clock signal into the access-side baseband signal, and outputs the access-side clock signal, in which the clock signal is embedded, to the baseband unit 422. The baseband unit 422 extracts the clock signal embedded in the access-side baseband signal (because the interface unit 4212 embeds the clock signal, which is obtained by the satellite signal processing module 100 through decoding processing on the received satellite radio frequency signal, into the access-side baseband signal, the clock signal extracted by the baseband unit 422 from the access-side baseband signal of the interface unit 4212 is equivalent to the clock signal which is obtained by the satellite signal processing module 100 through decoding processing on the satellite radio frequency signal), uses the clock signal (the clock signal may include, for example, a reference clock source signal, and may further include satellite absolute time information) to perform clock calibration and control and so on, and performs baseband processing on the access-side baseband signal.

As can be seen above, in this embodiment, the satellite signal processing module is set in the remote radio unit of the base station indoor apparatus, and the signals received by the satellite antenna and radio access antenna are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

Embodiment 4

Referring to FIG. 5-a, in another embodiment of a radio base station provided by an embodiment of the present invention, a radio base station 500 may include a base station outdoor apparatus 510 and a base station indoor apparatus 520.

The base station outdoor apparatus 510 includes: a ground service antenna 512, a satellite antenna 511, a satellite signal processing module 100 configured to perform decoding processing on a satellite radio frequency signal received by the satellite antenna to obtain a satellite service signal, and a first ground service processing module 513 configured to perform demodulation processing on a modulation signal received by the ground service antenna 512, where the ground service antenna 512 may be a microwave transmission antenna or a radio access antenna.

The satellite service signal is transmitted to the base station indoor apparatus 520 through a second data line 530, and the modulation signal that is received by the ground service antenna 512 and has undergone demodulation processing by the first ground service processing module 513 is transmitted to the base station indoor apparatus 520 through the second data line 530.

The second data line 530 may be an optical fiber, a network cable, or a signal transmission line of another type.

In an application scenario, the satellite signal processing module 100 may perform decoding processing on the satellite radio frequency signal received by the satellite antenna to obtain a satellite service signal (the satellite service signal may include a position signal and a clock signal, where the clock signal may include, for example, a reference clock source signal, and may further include satellite absolute time information), and output the satellite service signal to the first ground service processing module 513. The first ground service processing module 513 may be further configured to embed the satellite service signal into the modulation signal that is received by the ground service antenna 512 and has undergone demodulation processing to obtain a coupled signal, and transmit the coupled signal to the base station indoor apparatus 520 through the second data line 530.

Referring to FIG. 5-b, in an application scenario, the satellite signal processing module 100 may be set in the first ground service processing module 513.

The first ground service processing module 513 is, for example, a remote radio unit, a microwave outdoor unit, a microwave outdoor integrated device, or another outdoor unit.

In an application scenario, if the ground service antenna 512 is a radio access antenna, the first ground service processing module 513 may be a remote radio unit, while the satellite signal processing module 100 may be set in the remote radio unit.

In an application scenario, if the ground service antenna 512 is a microwave transmission antenna, the first ground service processing module 513 may be a microwave outdoor integrated device, while the satellite signal processing module 100 may be set in the microwave outdoor integrated device.

Referring to FIG. 5-c, in an application scenario, the satellite antenna 511 may be connected to a lightning protection circuit (not illustrated in FIG. 5-c) of the first ground service processing module 513 through an adapter 514. The adapter 514 may perform coupling on the signals received by the satellite antenna 511 and ground service antenna 512, and transmit a coupled signal to the first ground service processing module 513. Sharing of the lightning protection circuit may be implemented in this manner, which may save the number of lightning protection circuits in comparison with the prior art.

In an application scenario, the satellite service signal which is obtained by the satellite signal processing module 100 through decoding processing on the satellite radio frequency signal includes: a clock signal (the clock signal may include, for example, a reference clock source signal, and may further include satellite absolute time information) and/or a position signal, and so on. In the embodiment of the present invention, specific illustration is mainly directed to a case that the satellite service signal is a clock signal (the clock signal may include, for example, a reference clock source signal, and may further include satellite absolute time information).

If the satellite signal processing module 100 obtains a clock signal through decoding processing, the satellite signal processing module 100 may further provide the baseband unit of the base station indoor apparatus 520 with the clock signal (the clock signal may include, for example, a reference clock source signal, and may further include satellite absolute time information), so that the baseband unit uses the clock signal to perform clock calibration and control and so on.

As can be seen above, in this embodiment, the satellite signal processing module is set in the base station outdoor apparatus, and the signals that are received by the satellite antenna and at least one other antenna and have undergone processing are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

Embodiment 5

This embodiment is illustrated mainly by using an example in which a satellite signal processing module is set in a remote radio unit of a base station outdoor apparatus.

Referring to FIG. 6-a, in another embodiment of a radio base station provided by the embodiment of the present invention, a radio base station 600 may include a base station outdoor apparatus 610 and a base station indoor apparatus 620.

The base station outdoor apparatus 610 may include: a satellite antenna 611 for receiving a satellite radio frequency signal, a radio access antenna 612 for receiving an access-side radio frequency signal, a remote radio unit 613, and a satellite signal processing module 100 configured to perform decoding processing on the satellite radio frequency signal received by the satellite antenna 611 to obtain a satellite service signal; and the satellite signal processing module 100 may be set in the remote radio unit 613, and definitely, may also be set outside the remote radio unit 613.

The base station indoor apparatus 620 may include a baseband unit 621 and so on.

The satellite radio frequency signal received by the satellite antenna 611 is transmitted to the satellite signal processing module 100; the access-side radio frequency signal received by the radio access antenna 612 is transmitted to the remote radio unit 613.

The remote radio unit 613 performs radio frequency processing on the access-side radio frequency signal to obtain an access-side baseband signal; the satellite signal processing module 100 performs decoding processing on the received satellite radio frequency signal to obtain a satellite service signal (which may include a clock signal, where the clock signal may include, for example, a reference clock source signal, and may further include satellite absolute time information). The remote radio unit 613 may embed the satellite service signal into the access-side baseband signal, perform interface format conversion (for example, a CPRI interface or an OBSAI interface format), and output the access-side baseband signal with the interface format converted to the baseband unit 621. The baseband unit 621 extracts the satellite service signal embedded in the access-side baseband signal, and performs baseband processing on the access-side baseband signal.

If the satellite signal processing module 100 performs decoding processing on the satellite radio frequency signal to obtain a clock signal, the baseband unit 621 may extract the clock signal embedded in the access-side baseband signal (because the remote radio unit 613 embeds the clock signal, which is obtained by the satellite signal processing module 100 through decoding processing on the received satellite radio frequency signal, into the access-side baseband signal, the clock signal extracted by the baseband unit 621 from the access-side baseband signal that is from the remote radio unit 613 is equivalent to the clock signal which is obtained by the satellite signal processing module 100 through decoding processing on the satellite radio frequency signal, where the clock signal may include, for example, a reference clock source signal, and may further include satellite absolute time information), and use the clock signal to perform clock calibration and control and so on.

Referring to FIG. 6-*b*, in another application scenario, the base station outdoor apparatus 610 may further include an adapter 614; the signals received by the satellite antenna 611 and radio access antenna 612 are transmitted to the remote radio unit 613 after being coupled by the adapter 614. For a specific processing process, reference may be made to the relevant description in the third embodiment.

Referring to FIG. 6-*c*, in an application scenario, the remote radio unit 613 may include a radio frequency processing unit 6131 and an interface unit 6132.

For example, the satellite radio frequency signal carries a clock signal; flow directions of signals and a working manner of each module in the base station 600 may be as follows.

The satellite antenna 611 receives the satellite radio frequency signal and outputs the satellite radio frequency signal to the satellite signal processing module 100 through a feeder; the radio access antenna 612 receives the access-side radio frequency signal and transmits the access-side radio frequency signal to the remote radio unit 613. The radio frequency processing unit 6131 of the remote radio unit 421 receives the access-side radio frequency signal, converts, through frequency conversion processing, the access-side radio frequency signal into an access-side baseband signal, and outputs the access-side baseband signal to the interface unit 6132; the satellite signal processing module 100 performs decoding processing on the received satellite radio frequency signal to obtain a clock signal (where the clock signal may include, for example, a reference clock source signal, and may further include satellite absolute time information), and outputs the clock signal to the interface unit 6132. The interface unit 6132 embeds the clock signal into the access-side baseband signal, and outputs the access-side baseband signal, in which the clock signal is embedded, to the baseband unit 621 through a data line 630. The baseband unit 621 extracts the clock signal embedded in the access-side baseband signal (because the interface unit 6132 of the remote radio unit 613 embeds the clock signal, which is obtained by the satellite signal processing module 100 through decoding processing on the received satellite radio frequency signal, into the access-side baseband signal, the clock signal extracted by the baseband unit 621 from the access-side baseband signal that is from the interface unit 6132 is equivalent to the clock signal which is obtained by the satellite signal processing module 100 through decoding processing on the satellite radio frequency signal), uses the clock signal (where the clock signal may include, for example, a reference clock source signal, and may further include satellite absolute time information) to perform clock calibration and control and so on, and performs baseband processing on the access-side baseband signal.

As can be seen above, in this embodiment, the satellite signal processing module is set in the remote radio unit of the base station indoor apparatus, and the signals that are received by the satellite antenna and at least one other antenna and have undergone processing are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

Embodiment 6

This embodiment is illustrated mainly by using an example in which the satellite signal processing module is set in a microwave outdoor integrated device of the base station outdoor apparatus.

Referring to FIG. 7-*a*, in another embodiment of a radio base station provided by the embodiment of the present invention, a radio base station 700 may include a base station outdoor apparatus 710 and a base station indoor apparatus 720.

The base station outdoor apparatus 710 may include: a satellite antenna 711, a radio access antenna 712, a microwave transmission antenna 713, a microwave outdoor integrated device 714, a satellite signal processing module 100 and so on.

The base station indoor apparatus 720 may include: a remote radio unit 721, and a baseband unit 722.

The satellite signal processing module 100 may be set in the microwave outdoor integrated device 714.

The radio access antenna 712 is connected to the remote radio unit 721 through a feeder, and the remote radio unit 721 is connected to the baseband unit 722 through a CPRI interface or an OBSAI interface. The remote radio unit 721 performs radio frequency processing on the access-side radio frequency signal received by the radio access antenna 712 to obtain an access-side baseband signal, and outputs the access-side baseband signal to the baseband unit 722 for baseband processing; the baseband unit 722 may also output the access-side baseband signal to be sent to the remote radio unit 721, and the remote radio unit 721 performs radio frequency processing on the access-side baseband signal to be sent to obtain an access-side radio frequency signal, and transmits the access-side radio frequency signal through the radio access antenna 712.

The satellite antenna 711 is connected to the satellite signal processing module 100; the satellite signal processing module 100 performs decoding processing on the satellite radio frequency signal received by the satellite antenna 711 to obtain a satellite service signal (the satellite service signal may include a clock signal, where the clock signal may include, for example, a reference clock source signal, and may further include satellite absolute time information). The microwave transmission antenna 713 is connected to the microwave outdoor integrated device 714; the microwave outdoor integrated device 714 performs decoding processing on the microwave radio frequency signal received by the microwave transmission antenna 713 to obtain a microwave service signal; the microwave outdoor integrated device 714 embeds the satellite service signal into the microwave service signal, performs signal format conversion (such as the Ethernet format, PDH format, and SDH format), and outputs, through the data line 730, the service signal with the format converted to the baseband unit 722 for processing.

If the satellite signal processing module 100 performs decoding processing on the satellite radio frequency signal to obtain a clock signal (where the clock signal may include, for example, a reference clock source signal, and may further include satellite absolute time information), the microwave outdoor integrated device 714 may use the clock signal to calibrate a clock of the microwave service signal. The baseband unit 722 may extract a clock signal from the microwave service signal with the clock calibrated (it can be understood that because the microwave outdoor integrated device 714 performs clock calibration on the microwave service signal by using the clock signal which is obtained by the satellite signal processing module 100 through decoding processing on the satellite radio frequency signal, the clock signal extracted by the baseband unit 722 from the microwave service signal with the clock calibrated may be equivalent to the clock signal which is obtained by the satellite signal processing module 100 through decoding processing on the satellite radio frequency signal), and use the clock signal to perform clock calibration and control and so on.

Referring to FIG. 7-b, in an application scenario, the microwave outdoor integrated device 714 may include: a microwave intermediate frequency module 7141, a microwave baseband module 7142, a service interface module 7143, a clock module 7144, and a microwave radio frequency module 7145.

For example, the satellite radio frequency signal carries a clock signal; flow directions of signals and a working manner of each module in the base station 700 may be as follows.

The satellite antenna 711 receives the satellite radio frequency signal, and outputs the satellite radio frequency signal to the satellite signal processing module 100 through a feeder; the satellite signal processing module 100 performs decoding processing on the satellite radio frequency signal to obtain a clock signal (where the clock signal may include, for example, a reference clock source signal, and may further include satellite absolute time information), and provides the clock signal for the clock module 7144. The clock module 7144 uses the clock signal to calibrate its clock, and performs clock control on another module of the microwave outdoor integrated device 714. The microwave transmission antenna 713 receives the microwave radio frequency signal and outputs, through a feeder, the microwave radio frequency signal to the microwave outdoor integrated device 714; the microwave radio frequency module 7145 of the microwave outdoor integrated device 714 performs frequency conversion processing on the microwave radio frequency signal to obtain a microwave intermediate frequency signal, and the microwave radio frequency module 7145 outputs the microwave intermediate frequency signal to the microwave intermediate frequency module 7141. The microwave intermediate frequency module 7141 also converts the received microwave intermediate frequency signal into a microwave baseband signal, and outputs the microwave baseband signal to the microwave baseband module 7142; the microwave baseband module 7142 performs, under the clock control of the clock module 7144, baseband service processing on the microwave baseband signal to obtain a corresponding microwave service signal. The service interface module 7143 performs corresponding format conversion on the microwave service signal that is obtained by the microwave baseband module 7142 through processing, and outputs the microwave service signal with the format converted to the baseband unit 722. It can be understood that because the clock module 7144 calibrates its clock by using the clock signal which is obtained by the satellite signal processing module 100 through decoding processing on the received satellite radio frequency signal, while the microwave intermediate frequency module 7141, microwave baseband module 7142, and service interface module 7143 all process microwave signals under the clock control of the clock module 7144, the clock of the microwave service signal received by the baseband unit 722 is synchronous with a satellite. The baseband unit 722 may extract a clock signal (equivalent to the clock signal which is obtained by the satellite signal processing module 100 through decoding processing on the satellite radio frequency signal) from the microwave service signal that is from the microwave outdoor integrated device 714, and use the clock signal to perform clock calibration and control and so on.

As can be seen above, in this embodiment, the satellite signal processing module is set in the microwave outdoor integrated device of the base station outdoor apparatus, and the signals that are received by the satellite antenna and at least one other antenna and have undergone processing are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

Embodiment 7

Another embodiment of a radio base station according to the present invention is provided.

Figure 8:
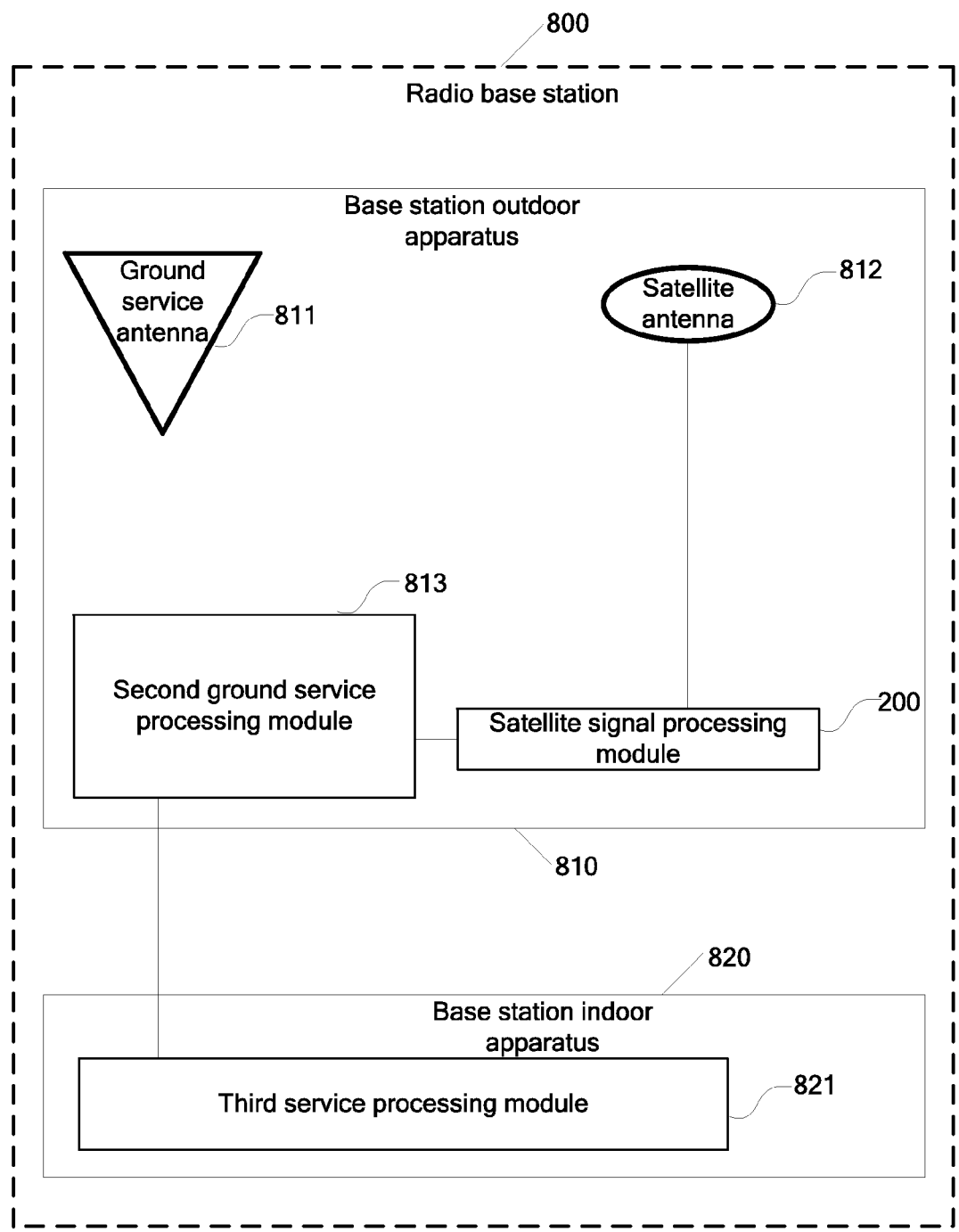
FIG. 8 is a schematic architecture diagram of a radio base station according to a seventh embodiment of the present invention.

Referring to FIG. 8, a radio base station 800 may include: a base station outdoor apparatus 810 and a base station indoor apparatus 820.

The base station outdoor apparatus 810 may include: a ground service antenna 811, a satellite antenna 812, a satellite signal processing module 200 configured to perform decoding processing on a satellite radio frequency signal received by the satellite antenna to obtain a reference clock source signal, and a second ground service processing module 813 configured to perform demodulation processing on a modulation signal received by the ground service antenna.

The second ground service processing module 813 is further configured to perform phase discrimination processing on a current system clock signal and the reference clock source signal that is obtained by the satellite signal processing module 200 to obtain a phase difference, generate a data packet carrying the phase difference, and send the data packet to the base station indoor apparatus 820.

The base station indoor apparatus 820 includes:
a third service processing module 821, configured to receive the data packet sent by the second ground service processing module 813, obtain the carried phase difference from the data packet, and perform phase-locked tracking according to the phase difference, so as to calibrate all system clock signals.

The third service processing module 821 may further send at least one type of the calibrated system clock signals to the second ground service processing module 813, another module of the base station outdoor apparatus, another module of the base station indoor apparatus, and/or another device connected to the radio base station.

The satellite signal processing module 200 may be integrated with the satellite antenna 812 to form a remote global positioning system (RGPS, Remote Global Positioning System); or the satellite signal processing module 200 may be integrated with the second ground service processing module 813, or the satellite signal processing module 200 may also be set independently.

The third service processing module 821 may be, for example, a baseband unit BBU, a microwave indoor unit, or another indoor module.

The second ground service processing module 813 may be, for example, a remote radio unit (RRU), a microwave outdoor unit or a microwave outdoor integrated device, or another outdoor module.

In an application scenario, the second ground service processing module 813 may be further configured to compare an initial phase of the reference clock source signal with an initial phase of a current system frame synchronization signal to obtain an initial phase deviation value, carry the initial phase deviation value in the data packet.

The third service processing module 821 is further configured to obtain the carried initial phase deviation value from the data packet, and calibrate the initial phase of the system frame synchronization signal according to the initial phase deviation value.

The third service processing module 821 may further send the system frame synchronization signal with the initial phase calibrated to the second ground service processing module 813, another module of the base station outdoor apparatus, another module of the base station indoor apparatus, and/or another device connected to the radio base station.

In an application scenario, if the satellite signal processing module 200 is further configured to obtain satellite absolute time information from the satellite radio frequency signal received by the satellite antenna 812, the second ground service processing module 813 may be further configured to have the satellite absolute time information carried in the data packet.

The third service processing module 821 may be further configured to obtain the carried satellite absolute time information from the data packet, and calibrate system absolute time according to the satellite absolute time information.

The satellite antenna 812 may receive signals transmitted by the satellites, for example, North American's GPS, Europe's Galileo, China's BeiDou, Russia's GLONASS and so on.

The satellite signal processing module 200 may be set in the second ground service processing module 813, or may also be set independently. In FIG. 8, a case that the satellite signal processing module 200 is set independently is taken for example.

In practical applications, the satellite signal processing module 200 and the satellite antenna 812 may be combined into a remote global positioning system (RGPS). The RGPS may be, for example, mounted on an independent pole to be installed independently, and connected to the second ground service processing module 813 through a feeder. Alternatively, the RGPS is directly installed on the second ground service processing module 813 through a mechanical part, and is connected to the second ground service processing module 813 through a feeder.

It can be understood that the ground service antenna 811 in the embodiment of the present invention may be a microwave transmission antenna, or may also be a radio access antenna (such as a radio frequency antenna). The embodiment of the present invention is similar to the foregoing embodiments, and may be applied in microwave communication and may also be applied in radio frequency communication. In the following, illustration is given with radio frequency communication as an example. Corresponding microwave communication may be performed with reference to the radio frequency communication and the corresponding microwave communication that is described in the foregoing embodiments.

For ease of understanding and illustration, a radio base station of a structure shown in FIG. 9-*a* is taken for example in the following. The radio base station shown in FIG. 9 may include: a base station outdoor apparatus 910 and a base station indoor apparatus 920.

The base station indoor apparatus 920 may include a baseband unit 921.

The base station outdoor apparatus 910 may include: a radio access antenna 911, a satellite antenna 912, a remote radio unit 913, and a satellite signal processing module 200 configured to perform decoding processing on a satellite radio frequency signal received by the satellite antenna 912 to obtain a reference clock source signal (of course, the satellite signal processing module 200 may further obtain satellite absolute time information from the satellite radio frequency signal).

The remote radio unit 913 may perform phase discrimination processing on a current system clock signal (for example, a 10 ms system clock signal or a system clock signal of another frequency, where the system clock signal may be provided by the baseband unit 921) and the reference clock source signal that is obtained by the satellite signal processing module 200, to obtain a phase difference (the remote radio unit 913 may also obtain satellite absolute time information from the satellite signal processing module 200); generate a data packet carrying the phase difference (where the data packet may further carry the satellite absolute time information), and send the data packet to the baseband unit 921 through an interface with the baseband unit 921.

Accordingly, the baseband unit 921 may receive, from the interface with the remote radio unit 913, the data packet carrying the phase difference, parse the data packet to obtain the carried phase difference, and perform phase-locked tracking according to the phase difference, so as to synchronize and calibrate all system clock signals. Further, the baseband unit 921 may send at least one type of the calibrated system clock signals to the remote radio unit 913 through the interface with the remote radio unit 913 (for example, a 10 ms system clock signal or a system clock signal of another frequency).

In addition, the remote radio unit 913 may be further configured to compare the initial phase of the reference clock source signal with the initial phase of the current system frame synchronization signal (the system frame synchronization signal may be provided by the baseband unit 921) to obtain an initial phase deviation value, and have the initial phase deviation value carried in the data packet carrying the phase difference.

The baseband unit 921 may obtain the carried initial phase deviation value from the data packet, and calibrate the initial phase of the system frame synchronization signal according to the initial phase deviation value. The baseband unit 921 may further send the system frame synchronization signal with the initial phase calibrated to the remote radio unit 913, another module of the base station outdoor apparatus 910, another module of the base station indoor apparatus 920, and/or another device connected to the radio base station.

Referring to FIG. 9-*b*, if the radio base station includes multiple remote radio units, the baseband unit 921 may be further configured to send at least one type (for example, a 10 ms system clock signal or a system clock signal of another frequency) of the calibrated system clock signals to other remote radio units through interfaces between the baseband unit 921 and the other remote radio units.

Referring to FIG. 9-*c*, FIG. 9-*c* is a schematic structural diagram of another radio base station according to an embodiment of the present invention.

A remote radio unit 913 mainly includes:
a field programmable gate array (FPGA, Field Programmable Gate Array) 9131 and a central processing unit (CPU, Central Processing Unit) 9132.

The field programmable gate array 9131 may be configured to perform phase discrimination processing on a current system clock signal and a reference clock source signal that is obtained by a satellite signal processing module 200 to obtain a phase difference (the field programmable gate array 9131 may also obtain satellite absolute time information from the satellite signal processing module 200, and the field programmable gate array 9131 may also compare an initial phase of the reference clock source signal with an initial phase of a current system frame synchronization signal to obtain an initial phase deviation value).

The central processing unit 9132 may be configured to generate a data packet carrying the phase difference obtained by the field programmable gate array 9131, where, if the field programmable gate array 9131 compares an initial phase of the reference clock source signal with an initial phase of a current system frame synchronization signal to obtain an initial phase deviation value, the data packet may further carry the initial phase deviation value; if the field programmable gate array 9131 further obtains satellite absolute time information, the data packet may further carry the satellite absolute time information, while a baseband unit 921 may use the satellite absolute time information to calibrate system absolute time.

The central processing unit 9132 and the field programmable gate array 9131 may transmit the data packet over a High-Level Data Link Control (HDLC, High-Level Data Link Control) protocol or another protocol.

The field programmable gate array 9131 may be further configured to perform framing (such as CPRI framing or framing of another format) on the data packet which is generated by the central processing unit 9132 and carries the phase difference, and send a combined data frame to a baseband unit 921 through an interface with the baseband unit 921.

Referring to FIG. 9-*d*, FIG. 9-*d* is a schematic structural diagram of a distributed base station according to an embodiment of the present invention.

A remote radio unit 913 in FIG. 9-*d* mainly includes:
a complex programmable logic device (CPLD, Complex Programmable Logic Device) 9133 and
a central processing unit (CPU, Central Processing Unit) 9132.

The complex programmable logic device 9133 may be configured to perform phase discrimination processing on a current system clock signal and a reference clock source signal that is obtained by a satellite signal processing module 200 to obtain a phase difference (the complex programmable logic device 9133 may also obtain satellite absolute time information from the satellite signal processing module 200, and the complex programmable logic device 9133 may also compare a initial phase of the reference clock source signal with an initial phase of a current system frame synchronization signal to obtain an initial phase deviation value).

The central processing unit 9132 may be configured to generate a data packet carrying the phase difference obtained by the complex programmable logic device 9133, where, if the complex programmable logic device 9133 compares an initial phase of the reference clock source signal with an initial phase of a current system frame synchronization signal to obtain an initial phase deviation value, the data packet may further carry the initial phase deviation value; if the complex programmable logic device 9133 further obtains satellite absolute time information, the data packet may further carry the satellite absolute time information, while the baseband unit 921 may use the satellite absolute time information to calibrate system absolute time.

The central processing unit 9132 and the complex programmable logic device 9133 may transmit the data packet over a High-Level Data Link Control (HDLC) protocol or another protocol.

The complex programmable logic device 9133 may be further configured to perform framing (such as CPRI framing or framing of another format) on the data packet which is generated by the central processing unit 9132 and carries the phase difference, and send a combined data frame to a baseband unit 921 through an interface with the baseband unit 921.

It can be understood that other hardware modules may also be deployed in the remote radio unit 913 so as to implement part or all of the functions of the field programmable gate array 9131 or complex programmable logic device 9133.

The baseband unit 921 may include, for example, a baseband interface board 9211 and a main processing and transmission unit (MPT) 9212.

The baseband interface board 9211 may be configured to receive, from the interface with the remote radio unit 913, a data frame of the data packet carrying the phase difference, perform deframing processing on the data frame to obtain the data packet carrying the phase difference, and send the data packet to the main processing and transmission unit 9212, where the case that the remote radio unit 913 performs framing processing on the data packet carrying the phase difference is taken for example here. If the remote radio unit 913 does not perform framing processing on the data packet carrying the phase difference, the baseband interface board 9211 may directly receive the data packet carrying the phase difference, and does not need to obtain the data packet carrying the phase difference through deframing processing.

The main processing and transmission unit 9212 may be configured to receive the data packet that carries the phase difference and is from the baseband interface board 9211, parse the data packet to obtain the phase difference, perform phase-locked tracking according to the phase difference, and calibrate all system clock signals.

The baseband interface board 9211 may be further configured to send at least one type of the system clock signals calibrated by the main processing and transmission unit 9212 to the remote radio unit 913 through the interface with the remote radio unit 913.

In addition, if the data packet from the baseband interface board 9211 further carries the initial phase deviation value, the main processing and transmission unit 9212 may calibrate the initial phase of the system frame synchronization signal according to the initial phase deviation value. The baseband interface board 9211 may further send the system frame synchronization signal with the initial phase calibrated to the remote radio unit 913, another module of the base station outdoor apparatus 910, another module of the base station indoor apparatus 920, and/or another device connected to the radio base station.

In addition, if the data packet from the baseband interface board 9211 further carries the satellite absolute time information, the main processing and transmission unit 9212 may calibrate the system satellite absolute time according to the satellite absolute time information and generate a system frame number.

In practical applications, the baseband unit 921 may further send at least one type of the calibrated system clock signals to a base station controller or a network element of a core network so as to synchronize a clock of the communication system.

Referring to FIG. 9-*e*, FIG. 9-*e* is a schematic structural diagram of another radio base station according to an embodiment of the present invention.

In the radio base station of a structure shown in FIG. 9-*e*, an FPGA (or a CPLD) in a remote radio unit 913 performs framing on data packet carrying a phase difference (or the data packet may further carry an initial phase deviation value and/or satellite absolute time information), and then sends a combined data frame to a baseband interface board 9211 in a baseband unit 921 through an optical interface (SERDES, serialization/de-serialization). An FPGA (or CPLD) in the baseband interface board 9211 performs deframing processing on the data frame from the remote radio unit 913 to obtain the data packet carrying the phase difference sends the data packet to a main processing and transmission unit 9212. A CPU in the main processing and transmission unit 9212 parses the data packet which is from the baseband interface board 9211 and carries the phase difference to obtain the phase difference. The main processing and transmission unit 9212 calibrates a clock of an OCXO (oven controlled crystal oscillator) according to the phase difference; the OCXO further outputs a calibrated first-level system clock signal to a PLL (phase-locked loop); and according to it, the PLL performs phase-locked tracking, and generates a second-level system clock signal and so on. Specifically, an FPGA in the main processing and transmission unit 9212 may generate, according to an accurate system clock signal generated by the PLL, a system clock signal of 10 ms or another frequency, and send it to the remote radio unit 913 through the baseband interface board 9211, may also send it to another remote radio unit, and may also send the system clock signal to remote radio unit the base station controller, or the network element of the core network.

This embodiment further provides a method for clock synchronization of a radio base station, where the radio base station includes a base station indoor apparatus and a base station outdoor apparatus, and the method includes:

The base station outdoor apparatus (for example, a remote radio unit, a microwave outdoor unit, a microwave outdoor integrated device, or another module in the base station outdoor apparatus) performs phase discrimination processing on a current system clock signal and a reference clock source signal that is obtained from a satellite radio frequency signal received by a satellite antenna to obtain a phase difference; generates a data packet carrying the phase difference (the data packet may further carry satellite absolute time information obtained from the satellite radio frequency signal received by the satellite antenna); and sends the data packet to the base station indoor apparatus. The base station indoor apparatus receives the data packet; obtains the carried phase difference from the data packet; and performs phase-locked tracking according to the phase difference, so as to calibrate all system clock signals. In addition, the base station outdoor apparatus (for example, the baseband unit, microwave indoor unit, or another module in the base station indoor apparatus) may also calibrate the system absolute time based on the satellite absolute time information carried in the data packet.

Further, the base station outdoor apparatus may send at least one type of the calibrated system clock signals to the base station indoor apparatus or other devices.

Further, the base station outdoor apparatus (for example, a remote radio unit, a microwave outdoor unit, a microwave outdoor integrated device, or another module in the base station outdoor apparatus) may also compare an initial phase of the reference clock source signal with an initial phase of a current system frame synchronization signal to obtain an initial phase deviation value; and have the initial phase deviation value carried in the data packet carrying the phase difference. The base station indoor apparatus (for example, the baseband unit, microwave indoor unit, or another module in the baseband indoor apparatus) may obtain the carried initial phase deviation value from the data packet; calibrate the initial phase of the system frame synchronization signal according to the initial phase deviation value, and send the system frame synchronization signal with the initial phase calibrated to the base station outdoor apparatus or other devices.

As can be seen above, in the radio base station of this embodiment, the satellite antenna is connected to a module in the base station outdoor apparatus, and the base station outdoor apparatus performs phase discrimination processing to obtain a phase difference, and then generates a data packet carrying the phase difference and sends the data packet to the base station indoor apparatus; and the base station indoor apparatus may obtain the carried phase difference from the data packet, and perform phase-locked tracking according to the phase difference, so as to synchronize and calibrate all system clock signals. Because the satellite antenna is connected to the base station outdoor apparatus, this is helpful for reducing the engineering cost and cost of auxiliary materials. Because the base station outdoor apparatus performs operations of phase discrimination to obtain the phase difference, and then the base station indoor apparatus performs phase-locked tracking, and synchronizes and calibrates all system clock signals, this distributed clock synchronization processing mechanism is helpful for simplifying modular design of the base station indoor apparatus and enhancing the multi-scenario applicability of the distributed base station.

In a specific scenario, if the RGPS is connected to the RRU, the RRU performs phase discrimination processing on a synchronization clock signal provided by the BBU and a reference clock source signal provided by the RGPS to obtain a phase difference, and then generates a data packet carrying the phase difference and sends the data packet to the BBU. The BBU obtains the carried phase difference from the data packet, and performs phase-locked tracking according to the phase difference, so as to synchronize and calibrate the system clock signal. Because the RGPS is connected to the RRU, this is helpful for reducing the engineering cost and cost of auxiliary materials. Because the RRU performs the operations of phase discrimination to obtain the phase difference, and then the BBU performs phase-locked tracking, and synchronizes and calibrates the system clock signal, this distributed clock synchronization processing mechanism is helpful for simplifying the modular design of the BBU and enhancing the multi-scenario applicability of the distributed base station.

Embodiment 8

Another embodiment of a radio base station according to the present invention is provided.

Figure 10:
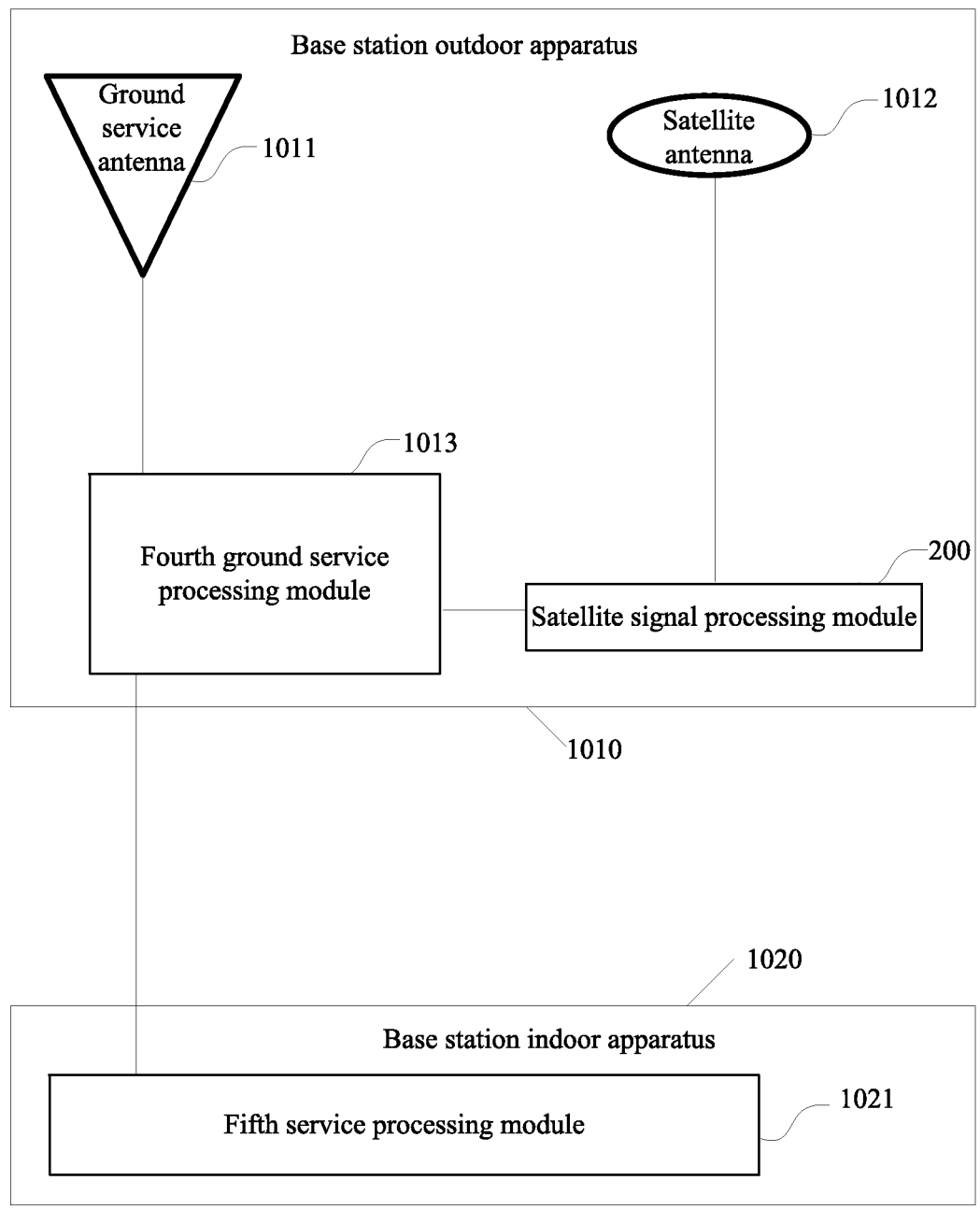
FIG. 10 is a schematic architecture diagram of a radio base station according to an eighth embodiment of the present invention.

Referring to FIG. 10, a radio base station 1000 may include: a base station outdoor apparatus 1010 and a base station indoor apparatus 1020.

The base station outdoor apparatus 1010 may include: a ground service antenna 1011, a satellite antenna 1012, a satellite signal processing module 200 configured to perform decoding processing on a satellite radio frequency signal received by the satellite antenna to obtain a reference clock source signal, and a fourth ground service processing module 1013 configured to perform demodulation processing on a modulation signal received by the ground service antenna.

The fourth ground service processing module 1013 is further configured to perform phase discrimination processing on a current system clock signal and the reference clock source signal that is obtained by the satellite signal processing module 200 to obtain a phase difference, perform phase-locked tracking according to the phase difference so as to calibrate all system clock signals, and send at least one type of the calibrated system clock signals to a fifth service processing module 1021 in the base station indoor apparatus 1020.

The fifth service processing module 1021 may be configured to send another remote radio unit or another device a system clock signal sent by the fourth ground service processing module 1013.

The satellite signal processing module 200 is integrated with the satellite antenna; or the satellite signal processing module 200 may be integrated with the fourth ground service processing module, or, the satellite signal processing module 200 may also be set independently.

In an application scenario, the fourth ground service processing module 1012 is further configured to compare an initial phase of the reference clock source signal with an initial phase of a current system frame synchronization signal to obtain an initial phase deviation value, calibrate the initial phase of the system frame synchronization signal according to the initial phase deviation value, and send the system frame synchronization signal with the initial phase calibrated to the fifth service processing module 1021.

The fifth service processing module 1021 may be configured to send other remote radio units or other devices the system frame synchronization signal that has the initial phase calibrated and is sent by the fourth ground service processing module 1013 remote radio unit.

In an application scenario, the satellite signal processing module 200 may be further configured to obtain satellite absolute time information from the satellite radio frequency signal received by the satellite antenna 1012, and the fourth ground service processing module 1013 is further configured to calibrate system absolute time according to the satellite absolute time information.

The fifth service processing module 1021 may be specifically a baseband unit, a microwave indoor unit, or another indoor module; the fourth ground service processing module 1012 may be specifically: a remote radio unit, a microwave outdoor unit, or a microwave outdoor integrated device, or another outdoor module.

This embodiment further provides another method for clock synchronization of a radio base station, where the radio base station includes a base station indoor apparatus and a base station outdoor apparatus, and the method includes.

The base station outdoor apparatus (for example, a remote radio unit, a microwave outdoor unit, a microwave outdoor integrated device, or another module in the base station outdoor apparatus) performs phase discrimination processing on a current system clock signal and a reference clock source signal that is obtained from a satellite radio frequency signal received by a satellite antenna to obtain a phase difference; and performs phase-locked tracking according to the phase difference so as to calibrate all system clock signals, and sends at least one type of the calibrated system clock signals to the base station indoor apparatus.

Further, the base station indoor apparatus (such as a baseband unit, a microwave indoor module, or another module in the base station indoor apparatus) may send another remote radio unit or another device a system clock signal sent by the base station outdoor apparatus.

In an application scenario, the base station outdoor apparatus may also compare an initial phase of the reference clock source signal with an initial phase of a current system frame synchronization signal to obtain an initial phase deviation value, calibrate the initial phase of the system frame synchronization signal according to the initial phase deviation value, and send the system frame synchronization signal with the initial phase calibrated to the base station indoor apparatus.

The base station indoor apparatus (such as a baseband unit, a microwave indoor module, or another module in the base station indoor apparatus) may send another remote radio unit or another device the system frame synchronization signal that has the initial phase calibrated and is sent by the base station outdoor apparatus.

In an application scenario, the base station outdoor apparatus may obtain satellite absolute time information from the satellite radio frequency signal received by the satellite antenna, and calibrate system absolute time according to the satellite absolute time information.

As can be seen above, in the radio base station of this embodiment, the satellite antenna is connected to a module in the base station outdoor apparatus, and the base station outdoor apparatus performs phase discrimination processing to obtain the phase difference; and performs phase-locked tracking according to the phase difference, so as to synchronize and calibrate all system clock signals. Because the satellite antenna is connected to the base station outdoor apparatus, this is helpful for reducing the engineering cost and cost of auxiliary materials.

It should be noted that, for ease of description, each of the foregoing method embodiments are described as a series of actions. Those skilled in the art should know that the present invention is not limited by the sequence of the described actions, because some of the actions may be performed in other sequence or be performed simultaneously. In addition, those skilled in the art should know that the embodiments described in this specification are exemplary embodiments, and that the involved actions and modules are not necessarily mandatory for the present invention.

In the foregoing embodiments, the description of each embodiment has its emphasis. For a part that is not detailed in one embodiment, reference may be made to the related description of another embodiment.

In conclusion, in one of the solutions of the embodiments of the present invention, the satellite signal processing module is set in the base station indoor apparatus, and the signals of the satellite antenna and at least one other antenna are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

In another solution of the embodiments of the present invention, the satellite signal processing module is set in the base station outdoor apparatus, and the signals of the satellite antenna and at least one other antenna are transmitted from the base station outdoor apparatus to the base station indoor apparatus through one data line, which simplifies the wiring of the feeder from the base station outdoor apparatus to the base station indoor apparatus, may decrease the number of lightning protection modules, and helps to reduce the manufacturing cost.

In still another solution provided by the embodiments of the present invention, in the radio base station, the satellite antenna is connected to a module in the base station outdoor apparatus, and the base station outdoor apparatus performs phase discrimination processing to obtain a phase difference, and then generates a data packet carrying the phase difference and sends the data packet to the base station indoor apparatus; and the base station indoor apparatus receives the data packet to obtain the phase carried discrimination difference from the data packet, and performs phase-locked tracking according to the phase difference, so as to synchronize and calibrate all system clock signals. Because the satellite antenna is connected to the base station outdoor apparatus, this is helpful for reducing the engineering cost and cost of auxiliary materials. Because the base station outdoor apparatus performs operations of phase discrimination processing to obtaining the phase difference, and then the base station indoor apparatus performs phase-locked tracking, and synchronizes and calibrates all system clock signals, this distributed clock synchronization processing mechanism is helpful for simplifying the modular design of the base station indoor apparatus and enhancing the multi-scenario applicability of the distributed base station.

In still another solution provided by the embodiments of the present invention, in the radio base station, the satellite antenna is connected to a module in the base station outdoor apparatus, and the base station outdoor apparatus performs phase discrimination processing to obtain a phase difference; and performs phase-locked tracking according to the phase difference, so as to synchronize and calibrate all system clock signals. Because the satellite antenna is connected to the base station outdoor apparatus, this is helpful for reducing the engineering cost and cost of auxiliary materials.

The embodiments of the present invention describe a radio base station, which includes the satellite antenna, a ground service antenna, a satellite signal processing module, and a ground service processing module in an indoor apparatus and a ground service processing module in an outdoor apparatus, where the satellite antenna and satellite signal processing module may be integrated into an RGPS, and the satellite signal processing module may also be integrated in the ground service processing module in the outdoor apparatus. In such architecture, the embodiments of the present invention further provide a method for processing and transmitting the satellite service signal that is obtained from the satellite, such as the clock signal and/or position signal, in the foregoing architecture. It can be understood that all descriptions of the embodiments of the present invention are based on the foregoing architecture and a signal processing and transmission manner; and in a reasonable situation, those skilled in the art may combine corresponding parts in each embodiment. In addition, the serial numbers of the embodiments in the embodiments of the present invention are used for clearer description only and do not represent merits or demerits of the solutions.

Persons of ordinary skill in the art can understand that all or part of the steps of the methods according to the embodiments may be implemented by a program instructing relevant hardware. The program may be stored in a computer readable storage medium, where the storage medium may include a read only memory, a random access memory, a magnetic disk, or a CD-ROM, and so on.

Detailed introduction is given for the distributed base station and the method for clock synchronization of the distributed base station which are provided by the embodiments of the present invention. Although the principle and implementation of the present invention are described by using specific examples, the illustration of the foregoing embodiments is used only to help to understand the method and core idea of the present invention. In addition, with respect to the implementation and applicability of the present invention, modifications and variations may be made by persons of ordinary skill in the art according to the idea of the present invention. Therefore, this specification shall not be construed as a limitation on the present invention.

What is claimed is:

1. A base station, comprising:
 a base station indoor apparatus; and
 a base station outdoor apparatus communicably coupled to the base station indoor apparatus via at least a single data line;
 wherein the base station outdoor apparatus comprises a ground service antenna configured to receive a ground service signal, a satellite antenna configured to receive a satellite radio frequency signal, a satellite signal processing module configured to perform decoding processing on the satellite radio frequency signal received by the satellite antenna to obtain a reference clock source signal, and a second ground service processing module configured to perform demodulation processing on the ground service signal received by the ground service antenna to obtain a demodulated signal;
 wherein the second ground service processing module is further configured to perform phase discrimination processing on a current system clock signal and the reference clock source signal that is obtained by the satellite signal processing module to obtain a phase difference, to generate a data packet carrying the phase difference, and to send the data packet carrying both the phase difference obtained from the satellite radio frequency signal and the demodulated signal obtained from the ground service signal over the single data line to the base station indoor apparatus; and wherein the base station indoor apparatus comprises a third service processing module, configured to receive the data packet and the demodulated signal, to obtain the carried phase difference from the data packet, and to perform phase-locked tracking according to the phase difference, so as to obtain a calibrated system clock signal.

2. The base station according to claim 1, wherein:
the second ground service processing module is further configured to compare an initial phase of the reference clock source signal with an initial phase of a current system frame synchronization signal to obtain an initial phase deviation value, and to have the initial phase deviation value carried in the data packet; and
the third service processing module is further configured to obtain the carried initial phase deviation value from the data packet, and to calibrate the initial phase of the system frame synchronization signal according to the initial phase deviation value.

3. The base station according to claim 1, wherein:
the satellite signal processing module is further configured to obtain satellite absolute time information from the satellite radio frequency signal received by the satellite antenna;
the second ground service processing module is further configured to have the satellite absolute time information carried in the data packet; and
the third service processing module is further configured to parse the data packet and to obtain the carried satellite absolute time information, and to calibrate system absolute time according to the satellite absolute time information.

4. The base station according to claim 1, wherein:
the satellite signal processing module is integrated with the satellite antenna to form a remote global positioning system (RGPS).

5. The base station according to claim 1, wherein:
the satellite signal processing module is integrated with the second ground service processing module.

6. The base station according to claim 1, wherein:
the third service processing module is specifically a baseband unit; and
the second ground service processing module is specifically a remote radio unit, a microwave outdoor unit, or a microwave outdoor integrated device.

7. A method for clock synchronization of a base station, wherein the base station comprises a base station indoor apparatus and a base station outdoor apparatus, and the method comprises:
performing, by the base station outdoor apparatus, demodulation processing on a ground service signal received by a ground service antenna of the base station outdoor apparatus to obtain a demodulated signal,
performing, by the base station outdoor apparatus, phase discrimination processing on a current system clock signal and a reference clock source signal that is obtained from a satellite radio frequency signal received by a satellite antenna included in the base station outdoor apparatus to obtain a phase difference;
generating, by the base station outdoor apparatus, a data packet carrying both the phase difference and the demodulated signal;
sending, by the base station outdoor apparatus, the data packet carrying both the phase difference obtained from the satellite radio frequency signal and the demodulated signal obtained from the ground service signal over a single data line to the base station indoor apparatus; and receiving, by the base station indoor apparatus, the data packet and the demodulated signal, obtaining the carried phase difference from the data packet, and performing phase-locked tracking according to the phase difference, so as to obtain a calibrated system clock signal.

8. The method according to claim 7, further comprising:
comparing, by the base station outdoor apparatus, an initial phase of the reference clock source signal with an initial phase of a current system frame synchronization signal to obtain an initial phase deviation value, and having the initial phase deviation value carried in the data packet and sending the data packet to the base station indoor apparatus; and
obtaining, by the base station indoor apparatus, the carried initial phase deviation value from the data packet, and calibrating the initial phase of the system frame synchronization signal according to the initial phase deviation value.

9. The method according to claim 7, further comprising:
obtaining, by the base station outdoor apparatus, satellite absolute time information from the satellite radio frequency signal received by the satellite antenna, and having the satellite absolute time information carried in the data packet and sending the data packet to the base station indoor apparatus; and
parsing, by the base station indoor apparatus, the data packet to obtain the carried satellite absolute time information, and calibrating system absolute time according to the satellite absolute time information.

10. The method according to claim 7, wherein the base station indoor apparatus comprises a baseband unit; and
the base station outdoor apparatus comprises: a ground service antenna, the satellite antenna, a satellite signal processing module configured to perform decoding processing on the satellite radio frequency signal received by the satellite antenna and to obtain the reference clock source signal, and one of a remote radio unit, a microwave outdoor unit, and a microwave outdoor integrated device which is configured to perform demodulation processing on a modulation signal received by the ground service antenna.

11. A base station, comprising:
a base station indoor apparatus; and
a base station outdoor apparatus communicably coupled to the base station indoor apparatus via at least a single data line;
wherein the base station outdoor apparatus comprises: a ground service antenna configured to receive a ground service signal, a satellite antenna configured to receive a satellite radio frequency signal, a satellite signal processing module configured to perform decoding processing on the satellite radio frequency signal received by the satellite antenna to obtain a reference clock source signal, and a fourth ground service processing module configured to perform demodulation processing on the ground service signal received by the ground service antenna to obtain a demodulated signal; and
wherein the fourth ground service processing module is further configured to perform phase discrimination processing on a current system clock signal and the reference clock source signal that is obtained by the satellite signal processing module to obtain a phase difference, and to send a data packet carrying both the phase difference obtained from the satellite radio frequency signal and the demodulated signal obtained from the ground service signal over the single data line to a fifth service processing module in the base station indoor apparatus.

12. The base station according to claim 11, wherein:
the fourth ground service processing module is further configured to compare an initial phase of the reference clock source signal with an initial phase of a current system frame synchronization signal to obtain an initial phase deviation value, to calibrate the initial phase of the system frame synchronization signal according to the initial phase deviation value, and to send the system frame synchronization signal with the initial phase calibrated to the fifth service processing module.

13. The base station according to claim 11, wherein:
the satellite signal processing module is integrated with the fourth ground service processing module.

14. The base station according to claim 11, wherein:
the fifth service processing module is a baseband unit; and
the fourth ground service processing module is a remote radio unit, a microwave outdoor unit, or a microwave outdoor integrated device.

15. A method for clock synchronization of a base station, wherein the base station comprises a base station indoor apparatus and a base station outdoor apparatus, and the method comprises:
performing, by the base station outdoor apparatus, demodulation processing on a ground service signal received by a ground service antenna of the base station outdoor apparatus to obtain a demodulated signal,
performing, by the base station outdoor apparatus, phase discrimination processing on a current system clock signal and a reference clock source signal that is obtained from a satellite radio frequency signal received by a satellite antenna included in the base station outdoor apparatus to obtain a phase difference; and
sending a data packet carrying both the phase difference obtained from the satellite radio frequency signal and the demodulated signal obtained from the ground service signal over a single data line to the base station indoor apparatus.

16. The method according to claim 15, wherein the base station outdoor apparatus comprises: a ground service antenna, the satellite antenna, a satellite signal processing module configured to perform decoding processing on the satellite radio frequency signal received by the satellite antenna to obtain the reference clock source signal, and one of a remote radio unit, a microwave outdoor unit, and a microwave outdoor integrated device, which is configured to perform demodulation processing on a modulation signal received by the ground service antenna; and
the base station indoor apparatus comprises a baseband unit.

* * * * *

UNITED STATES PATENT AND TRADEMARK OFFICE
CERTIFICATE OF CORRECTION

PATENT NO.       : 9,220,076 B2
APPLICATION NO.  : 13/691426
DATED            : December 22, 2015
INVENTOR(S)      : Yong He It is certified that error appears in the above-identified patent and that said Letters Patent is hereby corrected as shown below:

On the Title Page, Item (72) Inventors, line 3, delete "Shangahi (CN);" and insert
--Shanghai (CN);--.

Signed and Sealed this
Nineteenth Day of July, 2016

Michelle K. Lee
*Director of the United States Patent and Trademark Office*